(12) United States Patent
Kimura

(10) Patent No.: US 11,943,536 B2
(45) Date of Patent: Mar. 26, 2024

(54) APPARATUS, IMAGING APPARATUS, INTERCHANGEABLE LENS, AND METHOD FOR CONTROLLING IMAGE BLUR CORRECTION

(71) Applicant: CANON KABUSHIKI KAISHA, Tokyo (JP)

(72) Inventor: Masafumi Kimura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 99 days.

(21) Appl. No.: 17/852,004

(22) Filed: Jun. 28, 2022

(65) Prior Publication Data

US 2022/0417437 A1     Dec. 29, 2022

(30) Foreign Application Priority Data

Jun. 29, 2021   (JP) ................. 2021-108059

(51) Int. Cl.
*H04N 23/68* (2023.01)
*H04N 23/663* (2023.01)

(52) U.S. Cl.
CPC ......... *H04N 23/683* (2023.01); *H04N 23/663* (2023.01); *H04N 23/685* (2023.01)

(58) Field of Classification Search
CPC .. H04N 23/683; H04N 23/663; H04N 23/685; H04N 23/684; H04N 23/687; H04N 23/6812; G02B 27/646
See application file for complete search history.

(56) References Cited

U.S. PATENT DOCUMENTS

2016/0182828 A1* 6/2016 Ikeda ................. H04N 23/6812
                                                       348/208.5
2019/0222735 A1* 7/2019 Watanabe ............ H04N 23/683

FOREIGN PATENT DOCUMENTS

JP    H07104338 A    4/1995
JP    2019129373 A   8/2019

* cited by examiner

*Primary Examiner* — Kathleen V Nguyen
(74) *Attorney, Agent, or Firm* — CANON U.S.A., INC. IP Division

(57) ABSTRACT

An apparatus controls image blur correction by using a first correction unit and a second correction unit having a lower image blur correction performance than that of the first correction unit. The apparatus includes a first acquisition unit configured to acquire a first division ratio, a determination unit configured to determine a final division ratio based on the first division ratio, and a control unit configured to control the first and second correction units based on the determined final division ratio. The determination unit can determine a division ratio where a ratio of the first correction unit is larger than that in the first division ratio, as the final division ratio.

19 Claims, 8 Drawing Sheets

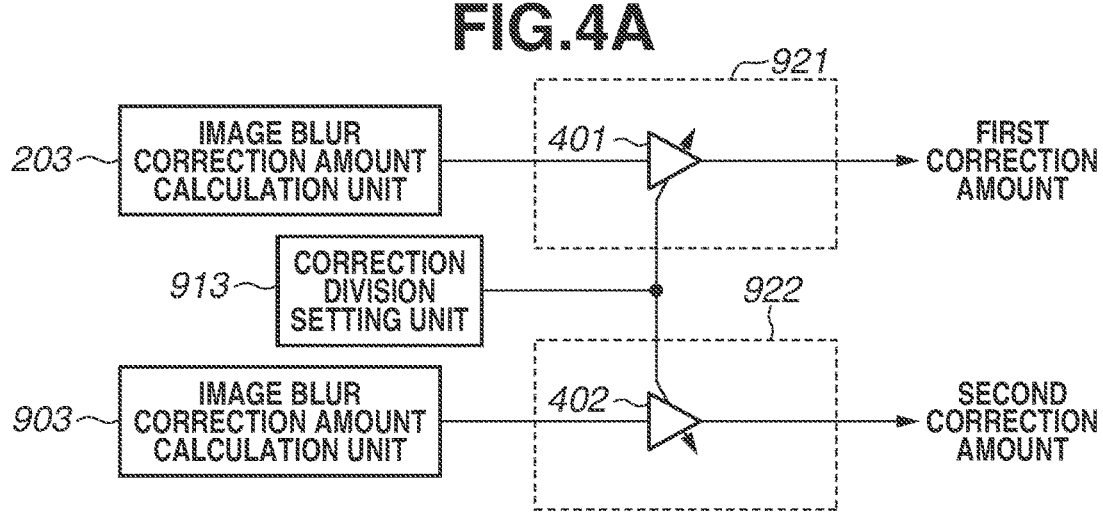
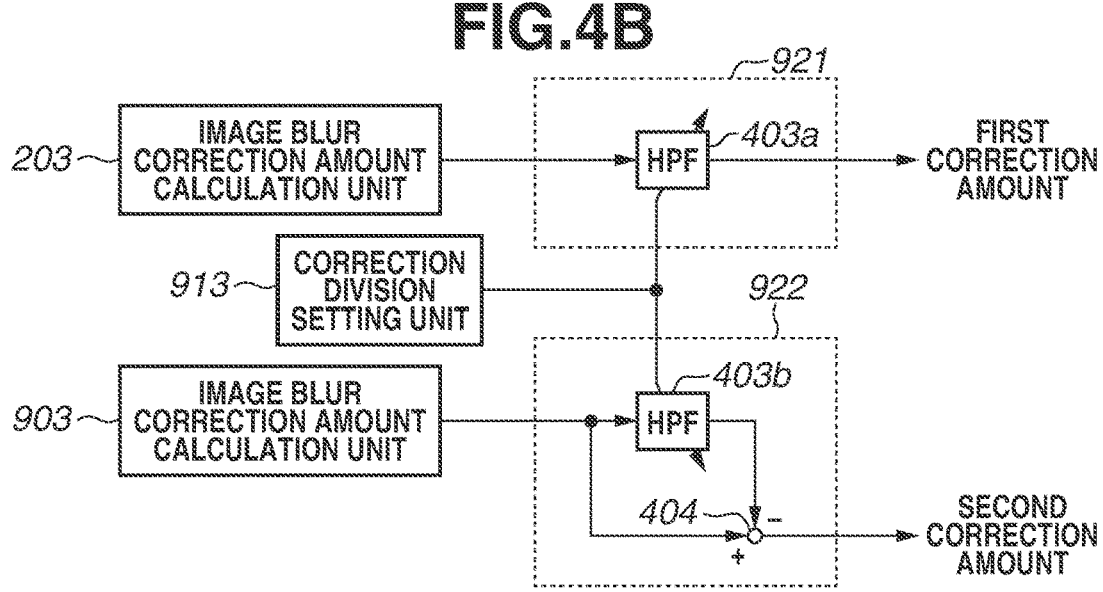
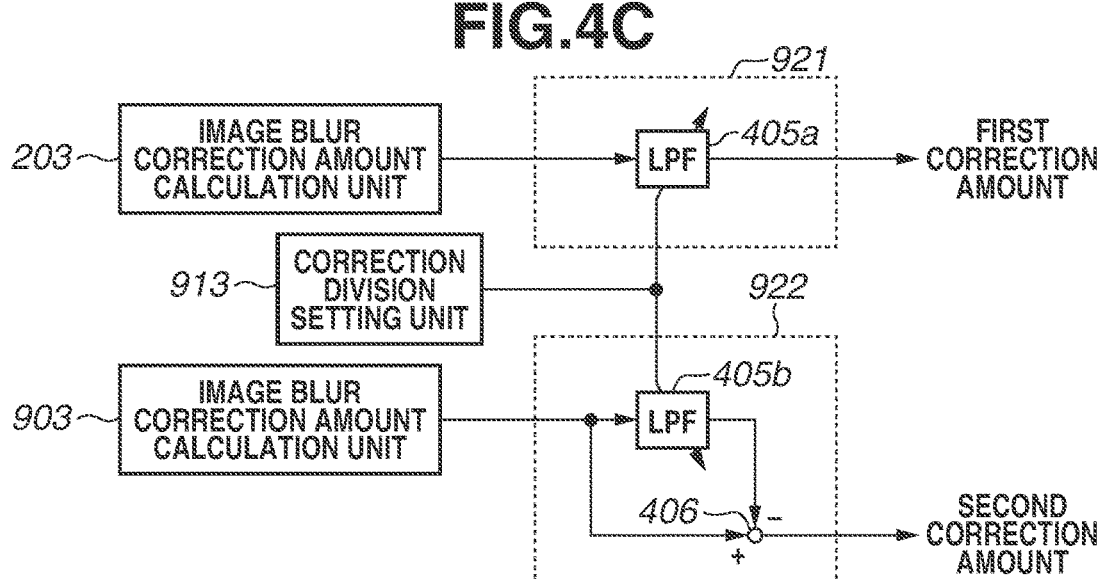

FIG.5A

| PERFORMANCE OF FIRST IMAGE BLUR CORRECTION UNIT: HIGH K1/K2 | | FOCAL LENGTH | | | |
|---|---|---|---|---|---|
| | | 24 mm OR LESS | 24 – 70 mm | 70 – 200 mm | 200 mm OR MORE |
| EXPOSURE TIME [s] | 1/60 OR LESS | ● 1.0/0.0 | ● 1.0/0.0 | 0.9/0.1 | 0.7/0.3 |
| | 1/60 – 1/15 | ● 1.0/0.0 | 0.9/0.1 | 0.7/0.3 | 0.6/0.4 |
| | 1/15 – 1/4 | 0.9/0.1 | 0.7/0.3 | 0.6/0.4 | 0.5/0.5 |
| | 1/4 – 1' | 0.7/0.3 | 0.6/0.4 | 0.5/0.5 | 0.4/0.6 |
| | 1' – 4' | 0.6/0.4 | 0.5/0.5 | 0.4/0.6 | ○ 0.3/0.7 |
| | 4' OR MORE | 0.5/0.5 | 0.4/0.6 | ○ 0.3/0.7 | ○ 0.3/0.7 |

FIG.5B

| PERFORMANCE OF SECOND IMAGE BLUR CORRECTION UNIT: HIGH K1/K2 | | FOCAL LENGTH | | | |
|---|---|---|---|---|---|
| | | 24 mm OR LESS | 24 – 70 mm | 70 – 200 mm | 200 mm OR MORE |
| EXPOSURE TIME [s] | 1/60 OR LESS | ● 0.0/1.0 | ● 0.0/1.0 | 0.1/0.9 | 0.2/0.8 |
| | 1/60 – 1/15 | ● 0.0/1.0 | 0.1/0.9 | 0.2/0.8 | 0.3/0.7 |
| | 1/15 – 1/4 | 0.1/0.9 | 0.2/0.8 | 0.3/0.7 | 0.4/0.6 |
| | 1/4 – 1' | 0.2/0.8 | 0.3/0.7 | 0.4/0.6 | 0.5/0.5 |
| | 1' – 4' | 0.3/0.7 | 0.4/0.6 | 0.5/0.5 | ○ 0.6/0.4 |
| | 4' OR MORE | 0.4/0.6 | 0.5/0.5 | ○ 0.6/0.4 | ○ 0.6/0.4 |

FIG.5C

| HPF/LPF CUTOFF FREQUENCY | | FOCAL LENGTH | | | |
|---|---|---|---|---|---|
| | | 24 mm OR LESS | 24 – 70 mm | 70 – 200 mm | 200 mm OR MORE |
| EXPOSURE TIME [s] | 1/60 OR LESS | ● 50 | ● 50 | 20 | 10 |
| | 1/60 – 1/15 | ● 50 | 20 | 10 | 5 |
| | 1/15 – 1/4 | 20 | 10 | 5 | 3 |
| | 1/4 – 1' | 10 | 5 | 3 | 2 |
| | 1' – 4' | 5 | 3 | 2 | ○ 1 |
| | 4' OR MORE | 3 | 2 | ○ 1 | ○ 1 |

APPARATUS, IMAGING APPARATUS, INTERCHANGEABLE LENS, AND METHOD FOR CONTROLLING IMAGE BLUR CORRECTION

BACKGROUND

Technical Field

The aspect of the embodiments relates to an image blur correction control apparatus, an imaging apparatus, an interchangeable lens, and an image blur correction control method.

Description of the Related Art

Techniques for correcting an image blur due to a shake applied to an imaging apparatus have been widely used. Methods for correcting an image blur include an optical image blur correction method for correcting an image blur by driving a correction optical system, which is a part of an optical system, in a plane perpendicular to an optical axis depending on a detected shake. Another method is an image sensor shift-type image blur correction method for correcting an image blur by driving an image sensor in the plane perpendicular to the optical axis depending on a detected shake.

A technique devised in recent years collaboratively drives the above-described plurality of correction methods to expand an image blur correction possible range, making it possible to correct a large shake that has not been correctable by a single correction method.

Japanese Patent Application Laid-Open No. 7-104338 discloses a technique for dividing an image blur correction signal into a high-frequency band and a low-frequency band, and correcting a high-frequency image blur by using one correction member and correcting a low-frequency image blur by using another correction member. Japanese Patent Application Laid-Open No. 2019-129373 discloses a technique for mainly operating one image stabilization member having a high performance among a plurality of image stabilization members and, when the one image stabilization member approaches a stroke end, operating another image stabilization member.

However, Japanese Patent Application Laid-Open No. 7-104338 does not disclose what kind of rule is used to determine a division ratio (a frequency to be a division basis).

To implement the method disclosed in Japanese Patent Application Laid-Open No. 2019-129373, it is necessary to suitably detect that the image stabilization member has approached the stroke end and transfer control at a high speed. This increases the load on monitoring and communication for detection.

The present invention has been devised in view of such a situation, and is directed to providing an apparatus capable of reducing the influence of an image blur by performing image blur correction by suitably and collaboratively driving a plurality of correction units in a simple configuration.

SUMMARY

According to an aspect of the embodiments, an apparatus that controls image blur correction by using a first correction unit and a second correction unit having a lower image blur correction performance than that of the first correction unit includes a first acquisition unit configured to acquire a first division ratio, a determination unit configured to determine a final division ratio based on the first division ratio, and a control unit configured to control the first and second correction units based on the determined final division ratio, wherein the determination unit can determine a division ratio where a ratio of the first correction unit is larger than that in the first division ratio, as the final division ratio.

Further features of the present invention will become apparent from the following description of exemplary embodiments with reference to the attached drawings.

BRIEF DESCRIPTION OF THE DRAWINGS

FIG. 4A is a block diagram illustrating an example of a configuration of a division control unit.

FIG. 4B is a block diagram illustrating an example of the configuration of the division control unit.

FIG. 4C is a block diagram illustrating an example of the configuration of the division control unit.

FIG. 5A illustrates an example of a setting of the division control unit.

FIG. 5B illustrates an example of the setting of the division control unit.

FIG. 5C illustrates an example of the setting of the division control unit.

DESCRIPTION OF THE EMBODIMENTS

Figure 1:
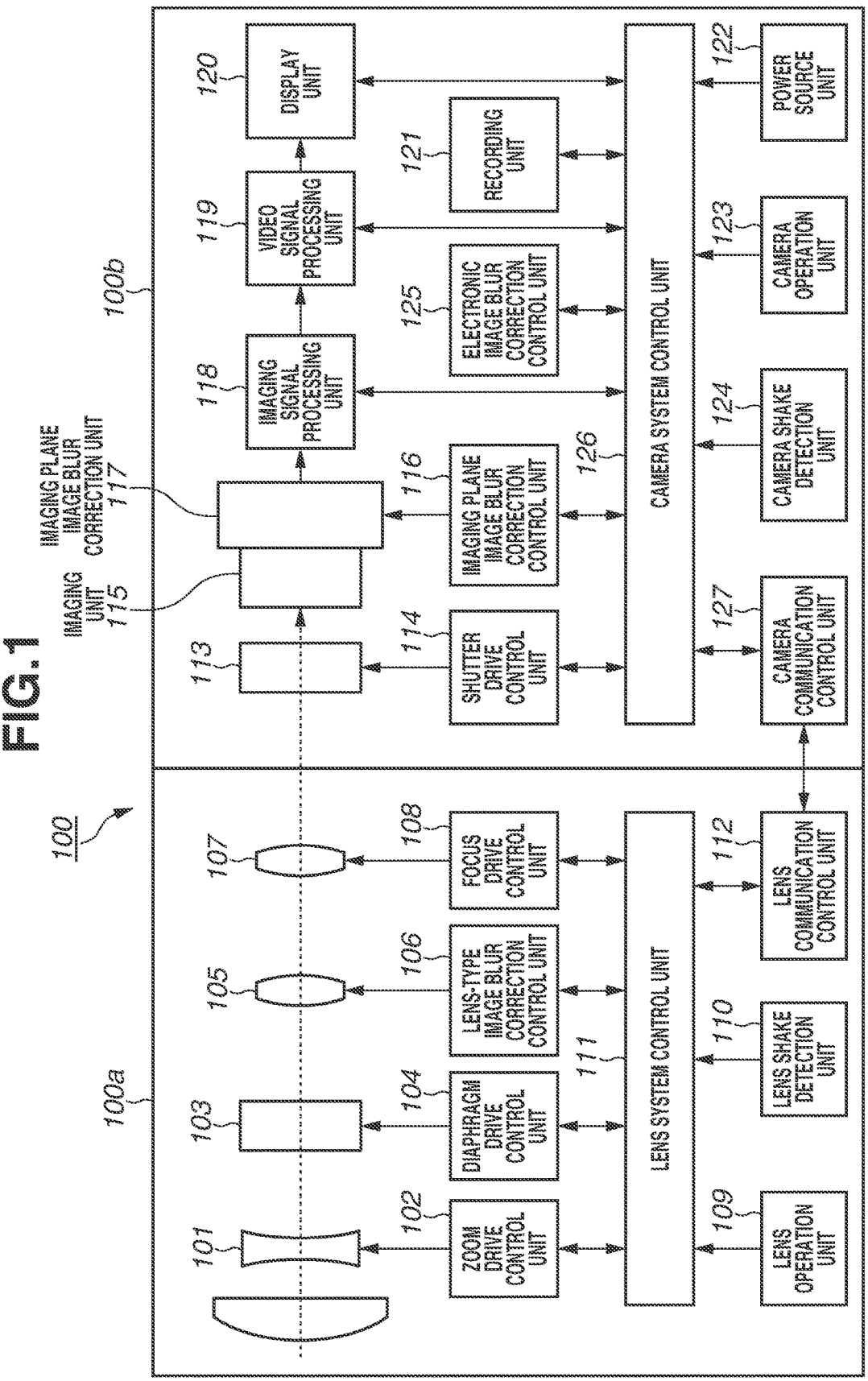
FIG. 1 is a block diagram illustrating a configuration of an imaging apparatus including an image blur correction apparatus.

Exemplary embodiments of the present invention will be described below with reference to the accompanying drawings. Throughout the accompanying drawings, elements assigned the same reference numerals represent identical or similar elements. The technical scope of the present invention is determined by claims, and is not limited to the following individual exemplary embodiments. Not all of combinations of features described in the exemplary embodiments are indispensable to the present invention. Features described in separate exemplary embodiments can be suitably combined.

In the following exemplary embodiments, a vibration applied to an imaging apparatus is referred to as a "shake", and an influence on a captured image caused by the shake applied to the imaging apparatus is referred to as an "image blur".

FIG. 1 is a block diagram illustrating a configuration of an imaging apparatus 100 including an image blur correction apparatus. The imaging apparatus 100 is a lens-interchangeable digital camera capable of capturing still images and moving images. However, the first exemplary embodiment is not limited to application to the lens-interchangeable digital camera. The present exemplary embodiment is applicable to various types of imaging apparatuses.

The imaging apparatus 100 is a system including an interchangeable lens 100a and a camera body 100b. The interchangeable lens 100a is configured to be attachable to the camera body 100b. The imaging apparatus 100 is used with the interchangeable lens 100a attached to the camera body 100b. A zoom unit 101 of the interchangeable lens 100a includes a zoom lens for changing magnification. A zoom drive control unit 102 drives and controls the zoom unit 101. A diaphragm unit 103 has a function of a diaphragm. A diaphragm drive control unit 104 drives and controls the diaphragm unit 103. A lens-type image blur correction unit 105 includes an image blur correction lens (hereinafter referred to as a "correction lens" or "Optical Image Stabilizer (OIS)") such as a shift lens. The image blur correction lens is movable in a direction perpendicular to the optical axis of the imaging apparatus 100. A lens-type image blur correction control unit 106 drives and controls the lens-type image blur correction unit 105. A focus unit 107 includes a focusing lens that performs focus adjustment and forms a subject image. A focus drive control unit 108 drives and controls the focus unit 107.

A lens operation unit 109 is used by a user to operate the interchangeable lens 100a.

A lens shake detection unit 110 detects the amount of shake applied to (occurring in) the imaging apparatus 100 or the interchangeable lens 100a, and outputs a detection signal to a lens system control unit 111. The lens system control unit 111 including a central processing unit (CPU) totally controls the drive control units and the correction control units of the interchangeable lens 100a to control the entire interchangeable lens 100a. The lens system control unit 111 communicates with a camera communication control unit 127 in the camera body 100b via a lens communication control unit 112. More specifically, in a state where the interchangeable lens 100a is attached to and electrically connected with the camera body 100b, the interchangeable lens 100a and the camera body 100b communicate with each other via the lens communication control unit 112 and the camera communication control unit 127.

The camera body 100b will be described below. The camera body 100b includes a shutter unit 113. A shutter drive control unit 114 drives and controls the shutter unit 113. An imaging unit 115 including an image sensor photoelectrically converts an optical image that has passed through each lens group into an electrical signal, and outputs the electrical signal. The image sensor of the imaging unit 115 is movable in a direction perpendicular to the optical axis of the imaging apparatus 100. An imaging plane image blur correction unit 117 includes an imaging plane image blur correction unit (hereinafter referred to as an "imaging plane correction unit" or "In-Body Image Stabilization (IBIS)") that moves the image sensor of the imaging unit 115 to correct an image blur. An imaging plane image blur correction control unit 116 drives and controls the imaging plane image blur correction unit 117. An imaging signal processing unit 118 converts the electrical signal output from the imaging unit 115 into a video signal. A video signal processing unit 119 processes the video signal output from the imaging signal processing unit 118 depending on usage. For example, the video signal processing unit 119 changes a clipping position of the video signal based on a correction amount of an electronic image blur correction control unit 125. The electronic image blur correction control unit 125 controls the image blur correction through image clipping.

A display unit 120 displays an image based on a signal output from the video signal processing unit 119 as required. A recording unit 121 stores various pieces of data such as video information. A power source unit 122 supplies power to the entire imaging apparatus 100 depending on usage. A camera operation unit 123, which is an operation unit used by the user to operate the camera body 100b, outputs an operation signal to a camera system control unit 126. A camera shake detection unit 124 detects the amount of shake applied to (occurring in) the imaging apparatus 100 or the camera body 100b, and outputs a detection signal to the camera system control unit 126. The camera system control unit 126 including a CPU totally controls the entire camera body 100b. The camera system control unit 126 communicates with the lens communication control unit 112 in the interchangeable lens 100a via the camera communication control unit 127. More specifically, in a state where the interchangeable lens 100a is attached to and electrically connected with the camera body 100b, the interchangeable lens 100a and the camera body 100b communicate with each other via the lens communication control unit 112 and the camera communication control unit 127.

An overall operation of the imaging apparatus 100 will be described below. The lens operation unit 109 and the camera operation unit 123 each include an image blur correction switch that turns image blur correction on or off. When the user operates the image blur correction switch to turn the image blur correction on, the lens system control unit 111 and the camera system control unit 126 each instruct the lens-type image blur correction control unit 106, the imaging plane image blur correction control unit 116, and the electronic image blur correction control unit 125 to perform an image blur correction operation. Until an instruction for turning the image blur correction off is issued, each of the image blur correction control units controls the image blur correction.

The camera operation unit 123 includes an image blur correction mode switch for selecting between a first mode and a second mode for image blur correction. The first mode is a mode in which image blur correction is performed using a combination of optical image blur correction and imaging plane image blur correction. The second mode is a mode in which image blur correction is performed using optical image blur correction, imaging plane image blur correction, and electronic image blur correction together. When the first mode is selected, performing image blur correction with a collaboration of the optical image blur correction and the imaging plane image blur correction enables implementing a wider correction angle, making it possible to correct a large shake. A reading position of the imaging unit 115 becomes constant, and image capturing with a wider angle is supported by expanding a reading range. When the second mode is selected, a clipping range of the video signal by the video signal processing unit 119 decreases, but a larger shake can be dealt with by changing the clipping position based on the image blur correction amount.

The camera operation unit 123 includes a shutter release button configured so that a first switch (SW1) and a second switch (SW2) sequentially turn on depending on an amount of pressing. When the user presses the shutter release button halfway down, SW1 turns on. When the user presses the shutter release button all the way down, SW2 turns on. When SW1 turns on, the focus drive control unit 108 drives the focus unit 107 to perform focus adjustment, and the diaphragm drive control unit 104 drives the diaphragm unit 103 to set a suitable exposure amount. When SW2 turns on, image data obtained from an optical image exposed by the imaging unit 115 is stored in the recording unit 121.

The camera operation unit 123 includes a moving image recording switch. After the user presses the moving image recording switch, the imaging apparatus 100 starts moving image capturing. When the user presses the moving image recording switch again during recording, the recording operation ends. When the user operates the shutter release button during moving image capturing to turn SW1 and SW2 on, the imaging apparatus 100 performs processing for acquiring and recording a static image during moving image recording. The camera operation unit 123 includes a playback mode selection switch for selecting the playback mode. When the playback mode is selected by operating the playback mode selection switch, the imaging apparatus 100 stops the image blur correction operation. One of the lens-type image blur correction unit 105 and the imaging plane image blur correction unit 117 (illustrated in FIG. 1) having a higher image blur correction performance functions as a first image blur correction unit (hereinafter referred to as a first optical image stabilization unit), and the other thereof functions as a second image blur correction unit (hereinafter referred to as a second optical image stabilization unit). In the present exemplary embodiment, examples of both of the units will be described below, and which of the two units is assumed will be suitably described in the descriptions.

Figure 2:
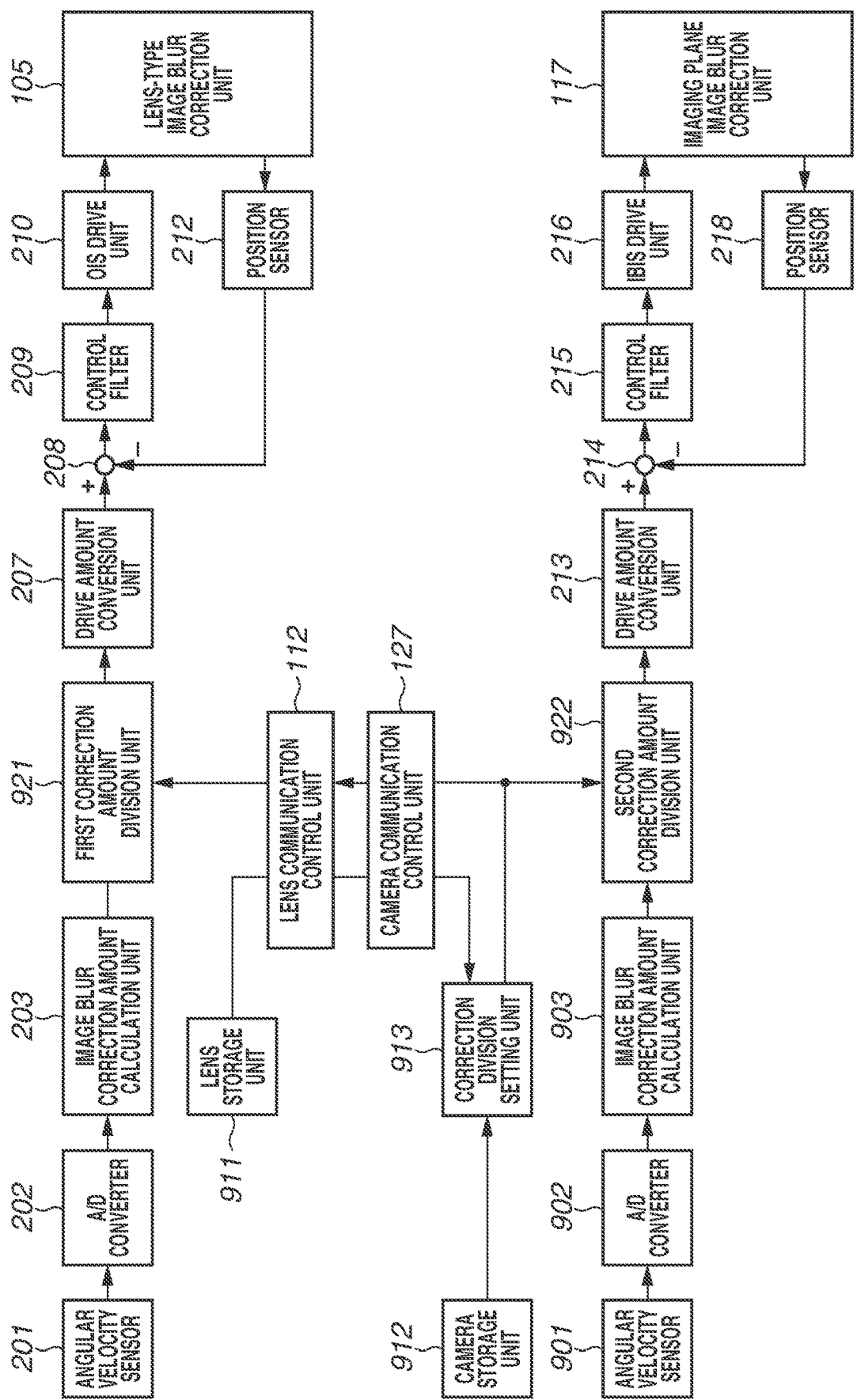
FIG. 2 is a block diagram illustrating image blur correction control according to a first exemplary embodiment.

Image blur correction control performed by the lens system control unit 111 and the camera system control unit 126 will be described below with reference to FIG. 2. FIG. 2 is a block diagram illustrating the image blur correction control performed by driving the lens-type image blur correction unit 105 and the imaging plane image blur correction unit 117 based on information about a shake applied to the imaging apparatus 100.

In FIG. 2, the lens shake detection unit 110 includes an angular velocity sensor 201 and an analog-to-digital (A/D) converter 202. The lens system control unit 111 implements an image blur correction amount calculation unit 203, a lens storage unit 911, and a first correction amount division unit 921. The lens-type image blur correction control unit 106 includes a drive amount conversion unit 207, a subtracter 208, a control filter 209, an OIS drive unit 210, and a position sensor 212. The camera shake detection unit 124 includes an angular velocity sensor 901 and an A/D converter 902. The camera system control unit 126 implements a camera storage unit 912, a correction division setting unit 913, and a second correction amount division unit 922. The imaging plane image blur correction control unit 116 includes a drive amount conversion unit 213, a subtracter 214, a control filter 215, an IBIS drive unit 216, and a position sensor 218.

In the present exemplary embodiment, the imaging apparatus 100 acquires the correction amount for image blur correction by using the angular velocity sensor 201 and then drives the lens-type image blur correction unit 105. The imaging apparatus 100 also acquires the correction amount for image blur correction by using the angular velocity sensor 901 and then drives the imaging plane image blur correction unit 117. The imaging apparatus 100 exchanges information required to determine a division state and information about the division state via the lens communication control unit 112 and the camera communication control unit 127.

The angular velocity sensor 201 detects the angular velocity of the shake applied to the imaging apparatus 100 and then outputs a voltage corresponding to the angular velocity. The output voltage of the angular velocity sensor 201 is converted into digital data by the A/D converter 202 (acquired as angular velocity data) and then supplied to the image blur correction amount calculation unit 203. Likewise, the output voltage of the angular velocity sensor 901 is converted into digital data by the A/D converter 902 and then supplied to an image blur correction amount calculation unit 903. A series of processes from the acquisition of angular velocity data to driving of the image blur correction units 105 and 117 is repetitively performed at sufficiently high speed intervals with respect to a shake frequency band of 1 to 20 Hz, for example, at intervals of 1,000 Hz.

The image blur correction amount calculation unit 203 calculates the correction amount for correcting an image blur caused by a shake applied to the imaging apparatus 100. Likewise, the image blur correction amount calculation unit 903 calculates the correction amount for correcting an image blur caused by a shake applied to the imaging apparatus 100. The imaging apparatus 100 includes two different image blur correction units: the lens-type image blur correction unit 105 and the imaging plane image blur correction unit 117. However, the correction amounts calculated by the image blur correction amount calculation units 203 and 903 are not the correction amounts for the two image blur correction units but the correction amounts for correcting the image blur of the entire imaging apparatus 100.

Figure 3:
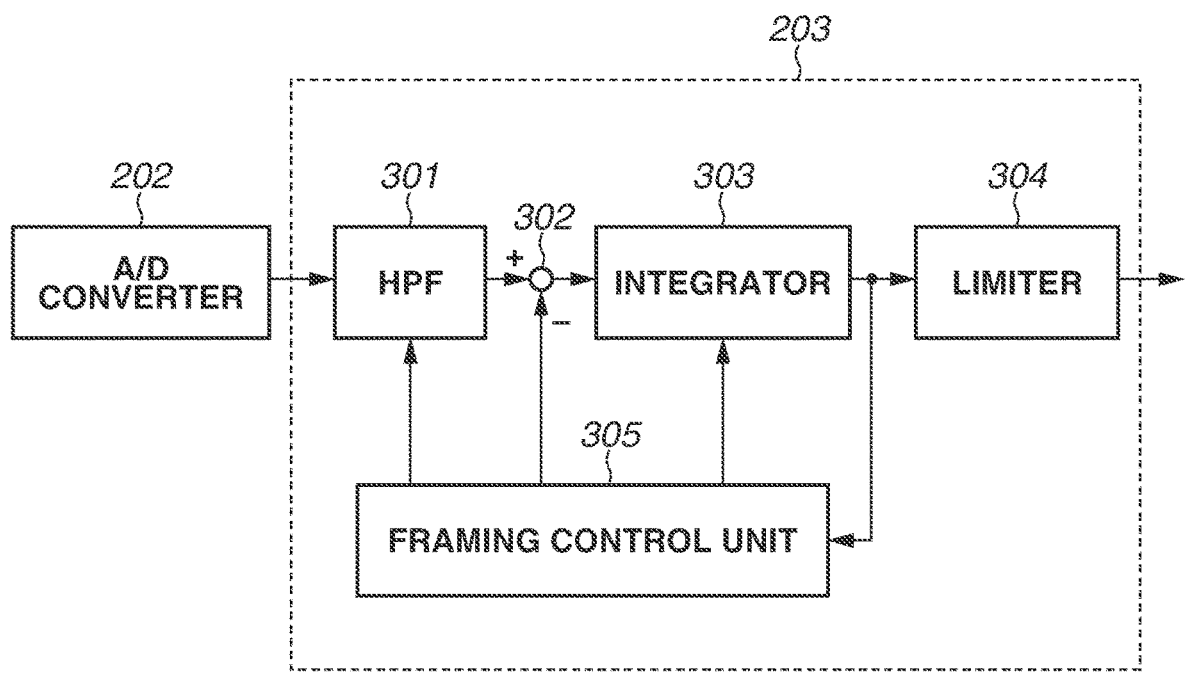
FIG. 3 is a block diagram illustrating details of an image blur correction amount calculation unit.

FIG. 3 is a block diagram illustrating details of the image blur correction amount calculation unit 203. One of the image blur correction amount calculation units is described below since the image blur correction amount calculation unit 903 has the same structure. A high-pass filter (HPF) 301 is used to remove a direct current (DC) component and a low-frequency component of the angular velocity data detected by the A/D converter 202. The angular velocity data through the HPF 301 is subjected to the first-order integration by an integrator 303 to be converted into angular displacement data. A cutoff frequency of the HPF 301 is determined by characteristics of the angular velocity sensor 201. More specifically, when the angular velocity sensor 201 has a large drift (fluctuation at low-frequencies, also referred to as a random walk), the cutoff frequency is increased to sufficiently reduce noise. When the angular velocity sensor 201 has a small drift, a cutoff band is decreased to obtain data close to the complete integral. A smaller drift enables providing a higher image stabilization performance. To prevent saturation, the following integration operation is incomplete integration which is performed by using a generally-known first-order low-pass filter (LPF). The angular displacement data calculated by the integrator 303 is supplied to a framing control unit 305 and a limiter 304. The limiter 304 limits the angular displacement data so that the lens-type image blur correction unit 105 and the imaging plane image blur correction unit 117 do not reach the end of a movable range. The angular displacement data limited by the limiter 304 is output to the first correction amount division unit 921 as the output of the image blur correction amount calculation unit 203.

The framing control unit 305 determines whether an operation intended by the user, such as panning or tilting, has been performed, and performs control to return the angular displacement data to the center. In other words, the framing control unit 305 removes a shake component intended by the user due to framing of the imaging apparatus 100 from the angular velocity detected by the angular velocity sensor 201 (the angular displacement data acquired by the A/D converter 202). This enables correcting an image blur due to a camera shake while performing the framing intended by the user. More specifically, a predetermined threshold value is provided on the inner side of a control end of the angular displacement data provided on the limiter 304. When the angular displacement data output from the integrator 303 exceeds the threshold value, panning is determined to have been performed. When panning is determined to have been performed, the framing control unit 305 limits the angular velocity data by increasing the cutoff frequency of the HPF 301 to remove as many lower frequency components as possible. Alternatively, the framing control unit 305 may subtract an offset from the angular velocity data input to the integrator 303 so that the output of the integrator 303 shifts back to the center. Alternatively, the framing control unit 305 may increase the cutoff frequency of the LPF calculation performed by the integrator 303 so that the output of the integrator 303 shifts back to the center. This enables controlling the lens-type image blur correction unit 105 and the imaging plane image blur correction unit 117 to remain within the movable range even if the shake intended by the user, such as panning or tilting, occurs. The above-described configuration of the image blur correction amount calculation unit 203 is also included in the image blur correction amount calculation unit 903.

Referring back to FIG. 2, the correction division setting unit 913 functions as a division ratio determination unit that determines a division ratio of the first and second optical image stabilization units based on information about the image stabilization performance and the movable range stored in the lens storage unit 911 and the camera storage unit 912.

The information stored in the lens storage unit 911 and the camera storage unit 912 will be described below. The information about the movable range refers to information about the operable range ( μm,  pulses) of the lens-type image blur correction unit 105 and the imaging plane image blur correction unit 117 or information about the operable range converted into what is called an image blur amount of a captured image (** deg). The information about the image stabilization performance is determined by the transfer characteristics ranging from the angular velocity sensors 201 and 901 to the lens-type image blur correction unit 105 and the imaging plane image blur correction unit 117. The information can be stored in the form of the transfer characteristics (frequency response) or stored as numeric values acquired by using a certain test method. The image stabilization performance of the interchangeable lens 100a refers to the performance in correcting the shake acquired by the angular velocity sensor 201 by using the lens-type image blur correction unit 105. The information is stored in the lens storage unit 911. The image stabilization performance of the camera body 100b refers to the performance in correcting the shake acquired by the angular velocity sensor 901 by using the imaging plane image blur correction unit 117. The information is stored in the lens storage unit 911.

Division information determined by the correction division setting unit 913 is transmitted to the first correction amount division unit 921 and the second correction amount division unit 922. Suitable processing is performed based on the outputs from the image blur correction amount calculation units 203 and 903 and the division information. Then, the image blur correction operation is performed. More specifically, the correction division setting unit 913 transmits the division information to the first correction amount division unit 921 and the second correction amount division unit 922 to set the division ratio, thus controlling the image blur correction operation of the lens-type image blur correction unit 105 and the imaging plane image blur correction unit 117. These operations will be described in detail below with reference to FIGS. 4A, 4B, 4C, 5A, 5B, and 5C. In the entire imaging apparatus 100, the correction division setting unit 913, the first correction amount division unit 921, and the second correction amount division unit 922 constitute a division control unit. One of the lens storage unit 911 and the camera storage unit 912 is a first storage unit, and the other thereof is a second storage unit. For example, the first storage unit will be the storage unit of one of the image blur correction units having a higher performance. When the lens-type image blur correction unit 105 included in the interchangeable lens 100a has a higher image stabilization performance, the lens storage unit 911 serves as the first storage unit.

FIGS. 4A, 4B, and 4C are block diagrams illustrating examples of configurations of the correction division setting unit 913, the first correction amount division unit 921, and the second correction amount division unit 922 included in the division control unit. FIG. 4A illustrates an example of dividing the image blur correction amount for the entire imaging apparatus 100 into the first and second correction amounts by using the gain. FIGS. 4B and 4C illustrate examples of dividing the image blur correction amount for the entire imaging apparatus 100 by using filters.

In FIG. 4A, a multiplier 401 multiplies the image blur correction amount calculated by the image blur correction amount calculation unit 203 by a first magnification K1 determined by the correction division setting unit 913, and outputs a first correction amount. K1 denotes the magnification that satisfies Formula 1:

$$0 \leq K1 \leq 1 \quad \text{(Formula 1)}$$

The image blur correction amount multiplied by the first magnification K1 by the multiplier 401 serves as the first correction amount that is the correction amount used when image blur correction is performed by the lens-type image blur correction unit 105.

Likewise, a multiplier 402 multiplies the image blur correction amount calculated by the image blur correction amount calculation unit 903 by a second magnification K2 determined by the correction division setting unit 913, and outputs a second correction amount. K2 denotes the magnification that satisfies Formula 2:

$$K1 + K2 = 1 \quad \text{(Formula 2)}$$

The image blur correction amount multiplied by the second magnification K2 by the multiplier 402 serves as the second correction amount that is the correction amount used when image blur correction is performed by the imaging plane image blur correction unit 117.

As expressed in Formula 2, the image blur correction amount is divided in such a way that the first and second correction amounts added together gives the image blur correction amount for the entire imaging apparatus 100.

While, in FIG. 4A, the image blur correction amount is divided based on the predetermined ratio (K1:K2), the image blur correction amount may be divided based on a frequency band. FIGS. 4B and 4C illustrate examples of a configuration of the correction division setting unit 913 when the image blur correction amount is divided based on the frequency band.

In FIG. 4B, HPFs 403a and 403b pass only high-frequency bands. The HPFs 403a and 403b have the same characteristics. The HPF 403a passes only high-frequency bands of the image blur correction amount calculated by the image blur correction amount calculation unit 203, and calculates the image blur correction amount as the first correction amount.

Likewise, the HPF 403b passes only high-frequency bands of the image blur correction amount calculated by the image blur correction amount calculation unit 903. A subtracter 404 extracts the second correction amount (low-frequency components) by subtracting the amount (high-frequency components) calculated by the HPF 403b.

Generally, dominant shakes acting on the imaging apparatus 100 are low-frequency components. Thus, either the lens-type image blur correction unit 105 or the imaging plane image blur correction unit 117 having a higher image blur correction performance (hereinafter referred to as an image stabilization performance) is to be assigned to the low-frequency components. More specifically, in the example in FIG. 4B, the imaging plane image blur correction unit 117 driven with the second correction amount is the first optical image stabilization unit having a relatively high image stabilization performance. If the lens-type image blur correction unit 105 has the higher performance, the configurations of the first correction amount division unit 921 and the second correction amount division unit 922 are to be exchanged.

In the configuration as illustrated in FIG. 4B, the correction amount is divided so that the first and second correction amounts added together gives the image blur correction amount for the entire imaging apparatus 100.

In FIG. 4C, LPFs 405a and 405b pass only low-frequency bands. The LPFs 405a and 405b have the same characteristics. The LPF 405a passes only low-frequency bands of the image blur correction amount calculated by the image blur correction amount calculation unit 203, and calculates the image blur correction amount as the first correction amount.

Likewise, the LPF 405b passes only low-frequency bands of the image blur correction amount calculated by the image blur correction amount calculation unit 903. A subtracter 406 extracts the second correction amount (high-frequency components) by subtracting the amount (low-frequency components) calculated by the LPF 405b. More specifically, in the example in FIG. 4C, the lens-type image blur correction unit 105 driven with the first correction amount is the first optical image stabilization unit having the relatively high image stabilization performance. As in FIG. 4B, if the imaging plane image blur correction unit 117 has the higher performance, the configurations of the first correction amount division unit 921 and the second correction amount division unit 922 are to be exchanged.

In the configuration as illustrated in FIG. 4C, the correction amount is divided so that the first and second correction amounts added together gives the image blur correction amount for the entire imaging apparatus 100.

Operations of the division control unit will be described in more detail below. In the example in FIG. 4A, as described above, the correction amount is divided at a suitable division ratio by using the multiplier 401 and the first magnification K1. A method for determining the first magnification K1 by the correction division setting unit 913 will be described below.

When the lens-type image blur correction unit 105 and the imaging plane image blur correction unit 117 have the same image stabilization performance, the correction amount may be divided based on a ratio between image blur correction possible amounts of the lens-type image blur correction unit 105 and the imaging plane image blur correction unit 117 on the imaging plane. More specifically, when the two units have the same correction possible amount, the first and second magnifications are equal (K1=K2=0.5). When one of the units has a larger correction amount, the first and second magnifications are determined based on the ratio. For example, when the lens-type image blur correction unit 105 has a larger correction amount, K1>0.5 and K2<0.5. With the above-described setting, sufficiently utilizing the correction possible amount enables preventing an image blur even if a large shake acts on the imaging apparatus 100. The image blur correction possible amount on the imaging plane refers to the correction amount obtained by converting the movable ranges of the lens-type image blur correction unit 105 and the imaging plane image blur correction unit 117 into image blur amounts. More specifically, the image blur correction possible amount on the imaging plane refers to the image blur correction amount when each of the lens-type image blur correction unit 105 and the imaging plane image blur correction unit 117 moves to the end of the movable range. The image blur correction possible amount of the imaging plane image blur correction unit 117 on the imaging plane changes depending on a focal length of an imaging optical system. Thus, when an interchangeable lens having a variable focal length is attached, the ratio between the first and second magnifications (K1:K2) is determined taking into consideration not only the movable range but also the focal length.

On the other hand, the image blur correction performances of the lens-type image blur correction unit 105 and the imaging plane image blur correction unit 117 are not generally equal. More specifically, the transfer characteristics of the system formed of the subtracter 208, the control filter 209, the OIS drive unit 210, the lens-type image blur correction unit 105, and the position sensor 212 (the frequency response of the lens-type image blur correction unit) do not coincide with the transfer characteristics of the system formed of the subtracter 214, the control filter 215, the IBIS drive unit 216, the imaging plane image blur correction unit 117, and the position sensor 218 (the frequency response of the imaging plane image blur correction unit). This is because the same correction performance cannot be implemented even if the control filters 209 and 215 are used because of differences in mass of a movable unit and type of an actuator.

As described above, the performances of the angular velocity sensors 201 and 901 may not be equal. The image stabilization performances determined by the performance ranging from the blur detection to the position control for the correction unit is stored in the lens storage unit 911 and the camera storage unit 912. In addition, information about the movable range of the lens-type image blur correction unit 105 is stored in the lens storage unit 911, and information about the movable range of the imaging plane image blur correction unit 117 is stored in the camera storage unit 912.

As an example, a case where the image stabilization performance of the interchangeable lens 100a is higher than that of the camera body 100b is described. In this case, the lens-type image blur correction unit 105 corresponds to the first optical image stabilization unit, the imaging plane image blur correction unit 117 corresponds to the second optical image stabilization unit, the lens storage unit 911 corresponds to the first storage unit, and the camera storage unit 912 corresponds to the second storage unit.

When only the movable range is focused, it is desirable that the image blur correction amount corrected for the entire imaging apparatus 100 (outputs of the image blur correction amount calculation units 203 and 903) is divided based on the ratio between the movable ranges (more specifically, the image blur correction possible amounts on the imaging plane, hereinafter referred to as image stabilization ranges) converted into the image blur amounts. For example, when the division ratio of the image stabilization ranges of the lens-type image blur correction unit 105 and the imaging plane image blur correction unit 117 is 3:7, moving the two units based on the division ratio enables easy handling of a large shake. The division method corresponds to a first division ratio that maximizes the image blur correction possible range (hereinafter referred to as an image stabilization range).

On the other hand, when the image stabilization range is ignored and only the image stabilization performance is focused, it is desirable to alternatively use the unit having a higher image stabilization performance (the frequency response is close to Gain=1, Phase=0 deg. against a shake acting on the imaging apparatus 100). The division method corresponds to a second division ratio that maximizes the image stabilization performance.

In this case, what is noteworthy is that, when the first division ratio is selected and a small shake acts on the imaging apparatus 100, a lower image stabilization performance is provided than when the second division ratio is selected. The degree of performance degradation is determined by the ratio between the image stabilization performances of the units. When a large shake acts on the imaging apparatus 100, the second division ratio is to be selected, and if only the first optical image stabilization unit is used, the correction possible amount runs short, resulting in a degraded image stabilization performance.

As described above, the first and second division ratios are each suitable when the magnitude of the shake and the image stabilization performance are focused. From the viewpoint of the magnitude of the shake, the use of the second division ratio is desirable for a small shake, and the use of the first division ratio is desirable for a large shake. Meanwhile, it may be desirable to divide the image blur correction amount by using a third division ratio between the first and second division ratios depending on imaging conditions. For example, when the second division ratio is used with only the image stabilization performance focused, the image stabilization range slightly runs short. When the first division ratio is used with only the image stabilization range focused, the image stabilization range is sufficient, and the image stabilization performance is remarkably degraded.

A method for determining the division ratio to be actually used to control the lens-type image blur correction unit 105 and the imaging plane image blur correction unit 117 (hereinafter referred to as a final division ratio) will be described below with reference to FIGS. 5A, 5B, and 5C. FIGS. 5A and 5B illustrate the final division ratio when the image blur correction amount is divided based on the gain, and correspond to the division method in FIG. 4A. FIG. 5C illustrates the final division ratio when the image blur correction amount is divided by using filters, and corresponds to the division methods in FIGS. 4B and 4C.

FIG. 5A illustrates examples of K1 and K2 settings when the interchangeable lens 100a has a relatively high image stabilization performance and the image blur correction amount is divided based on a predetermined ratio. The value to the left of the slash (/) denotes K1, and the value to the right of the slash denotes K2. FIG. 5B illustrates examples of K1 and K2 settings when the imaging plane image blur correction unit 117 has a relatively high image stabilization performance and the image blur correction amount is divided based on a predetermined ratio. The value to the left of the slash (/) denotes K1, and the value to the right of the slash denotes K2.

In FIGS. 5A, 5B, and 5C, a field indicated with "o" denotes the division ratio that maximizes the image stabilization range, i.e., the above-described first division ratio. A field indicated with "●" denotes the division ratio that maximizes the image stabilization performance, i.e., the above-described second division ratio. Other fields each denote a division ratio between the first and second division ratios, i.e., the above-described third division ratio.

When a small image blur occurs during exposure, a wide image stabilization range is not required (a small image stabilization range is acceptable) although an image blur occurs if the image blur correction is not performed. Thus, it is desirable to alternatively operate one of the units having a higher image stabilization performance with the second division ratio set as the final division ratio. In the example in FIG. 5A, when the exposure time is 1/60 [s] or less and the focal length is 70 mm or less, or when the exposure time is 1/60 to 1/15 [s] and the focal length is 24 mm or less, it is determined that an image blur occurring during exposure is small, and the first magnification K1=1 and the second magnification K2=0 are set. With these settings, the image blur correction operation is performed only by the interchangeable lens 100a having a relatively high image stabilization performance, and a high image stabilization performance is obtained.

On the other hand, when a large image blur occurs during exposure, the image stabilization range is assumed to run short with the second division ratio. In this case, it is assumed that the insufficient image stabilization range causes a larger image blur than the relatively degraded image stabilization performance does. Thus, it is desirable to set the first division ratio as the final division ratio, and operate the imaging apparatus 100 so that a wide image stabilization range is obtained. In the example in FIG. 5A, when the exposure time is 4 [s] or more and the focal length is 70 mm or more, or when the exposure time is 1 to 4 [s] and the focal length is 200 mm or more, a large image blur is determined to occur during exposure, and the first magnification K1=0.3 and the second magnification K2=0.7 are set. The magnification ratio may be acquired by reading information indicating the image stabilization range stored in the lens storage unit 911 and the camera storage unit 912, and then determined based on the information. This ensures a wide image stabilization range, achieving suitable image stabilization even if a large blur occurs.

As other conditions, the third division ratio between the first and second division ratios is set as the final division ratio, with K1+K2=1 (Formula 2) satisfied. This setting ensures the image stabilization range corresponding to the image blur amount which may occur during exposure and, at the same time, implements control that utilizes the image stabilization performance.

In the example in FIG. 5A, the focal length and exposure time are described as examples of the imaging conditions. The correction division setting unit 913 functions as an imaging condition acquisition unit that acquires the imaging conditions and determines the final division ratio in the table based on these pieces of information. A larger image blur occurs with a longer focal length and a longer exposure time.

Other dominant factors of the image blur amount include the imaging magnification of the imaging optical system, and a camera shake acted on the camera during the time period before the image capturing.

A larger image forming magnification will cause a larger image blur. The camera shake acted on the camera during the time period before the image capturing can be obtained through analysis of a shake acting on the imaging apparatus 100 prior to exposure and prediction of an image blur occurring during exposure. For simple example, it is predicted that, when the imaging apparatus 100 is installed on a tripod, a small image blur occurs during exposure because almost no shake is observed. When the imaging apparatus 100 is held by hand to capture an image, the magnitude of what is called a camera shake by the user is observed, and a suitable division ratio is selected based on the magnitude.

FIG. 5B is a table illustrating examples of K1 and K2 settings when the camera body 100b has a relatively high image stabilization performance, and the image blur correction amount is divided at a predetermined ratio. As in FIG. 5A, a field indicated with "o" denotes the division ratio that maximizes the image stabilization range, i.e., the above-described first division ratio. A field supplied with "●" denotes the division ratio that maximizes the image stabilization performance, i.e., the above-described second division ratio. Other fields each denote a division ratio between the first and second division ratios, i.e., the above-described third division ratio.

As illustrated in FIG. 5A, when a small image blur occurs during exposure, a small image stabilization range is acceptable. In this case, it is desirable to alternatively operate one of the units having a higher image stabilization performance (the camera body 100b in this case) with the second division ratio set as the final division ratio. On the contrary, when a large image blur occurs during exposure, the relatively degraded image stabilization performance is acceptable. In this case, it is desirable to operate the imaging apparatus 100 so that a wide image stabilization range is obtained with the first division ratio set as the final division ratio. In the example in FIG. 5B, the first magnification K1=0.6 and the second magnification K2=0.4 are set. As other conditions, the third division ratio between the first and second division ratios is set as the final division ratio, with K1+K2=1 (Formula 2) satisfied. This setting ensures the image stabilization range corresponding to the image blur amount which may occur during exposure and, at the same time, implements control that utilizes the image stabilization performance.

FIG. 5C is a table illustrating an example using filters. The values in the table denote the cutoff frequencies of the LPF and HPF filters. A case is described where the configuration in FIG. 4B and the table in FIG. 5C are used in combination. The configuration in FIG. 4B uses HPFs to determine the division ratio.

As in FIG. 5A, a field indicated with "o" denotes the division ratio that maximizes the image stabilization range, i.e., the above-described first division ratio. A filed indicated with "●" denotes the division ratio that maximizes the image stabilization performance, i.e., the above-described second division ratio. Other fields each denote a division ratio between the first and second division ratios, i.e., the above-described third division ratio.

When a small image blur occurs during exposure, a small image stabilization range is acceptable. In this case, it is desirable to alternatively operate one of the units having a higher stabilization performance with the second division ratio set as the final division ratio. In the example in FIG. 5C, as in the table in FIG. 5A, when the exposure time is 1/60 [s] or less and the focal length is 70 mm or less, or when the exposure time is 1/60 to 1/15 [s] and the focal length is 24 mm or less, a small image blur is determined to occur during exposure. With these imaging conditions, the cutoff frequency is set to 50 Hz. In almost all cases, a shake acting on the imaging apparatus 100 has a frequency lower than 50 Hz. Thus, the first correction amount in FIG. 4B becomes almost zero, and the image stabilization is performed only with the second correction amount. In this way, the image stabilization is almost performed only by the camera body 100b having a relatively high image stabilization performance, and thus a high image stabilization performance is achieved.

On the contrary, when a large image blur occurs during exposure, the relatively degraded image stabilization performance is acceptable. In this case, it is desirable to operate the imaging apparatus 100 so that a wide image stabilization range is obtained with the first division ratio set as the final division ratio. In the example in FIG. 5C, when the exposure time is 4 [s] or more and the focal length is 70 mm or more, or when the exposure time is 1 to 4 [s] and the focal length is 200 mm or more, a large image blur is determined to occur during exposure, and the cutoff frequency is set to 1 Hz. In this case, the first correction amount in FIG. 4B deals with a shake of 1 Hz or higher, and the second correction amount deals with a shake of 1 Hz or lower. Generally, components of a shake acting on the imaging apparatus 100 when a person holds the imaging apparatus 100 are known. Thus, the ratio between the correction amounts can be adjusted through adjustment of the cutoff frequency. The cutoff frequency may be determined based on the information indicating the image stabilization range stored in the lens storage unit 911 and the camera storage unit 912. This ensures a wide image stabilization range, and thus suitable image stabilization is achieved even if a large blur occurs.

As other conditions, the third division ratio between the first and second division ratios is used in the operation, with K1+K2=1 (Formula 2) satisfied. This setting ensures the image stabilization range corresponding to the image blur amount which may occur during exposure and, at the same time, implements control that utilizes the image stabilization performance.

Lastly, a case is described where the configuration in FIG. 4C and the table in FIG. 5C are used in combination. A field indicated with "o" denotes the division ratio that maximizes the image stabilization range, i.e., the above-described first division ratio. A field indicated with "●" denotes the division ratio that maximizes the image stabilization performance, i.e., the above-described second division ratio.

Other fields each denote a division ratio between the first and second division ratios, i.e., the above-described third division ratio.

When a small image blur occurs during exposure, a small image stabilization range is acceptable. In this case, it is desirable to alternatively operate one of the units having a higher stabilization performance with the second division ratio set as the final division ratio. In the example in FIG. 5C, the cutoff frequency is set to 50 Hz. In almost all cases, a shake acting on the imaging apparatus 100 has a frequency lower than 50 Hz. Thus, the second correction amount in FIG. 4C becomes almost zero, and the image stabilization is performed only with the first correction amount. In this way, the image stabilization is almost performed only by the interchangeable lens 100a having a relatively high image stabilization performance, and thus a high image stabilization performance is achieved.

On the contrary, when a large image blur occurs during exposure, the relatively degraded image stabilization performance is acceptable. In this case, it is desirable to operate the imaging apparatus 100 so that a wide image stabilization range is obtained with the first division ratio set as the final division ratio. For a condition supplied with "o", the cutoff frequency is set to 1 Hz. In this case, the first correction amount in FIG. 4C deals with a shake of 1 Hz or lower, and the second correction amount deals with a shake of 1 Hz or higher.

As other conditions, the third division ratio between the first and second division ratios is used in the operation, with K1+K2=1 (Formula 2) satisfied. This setting ensures the image stabilization range corresponding to the image blur amount which may occur during exposure and, at the same time, implements control that utilizes the image stabilization performance.

Figure 6A:
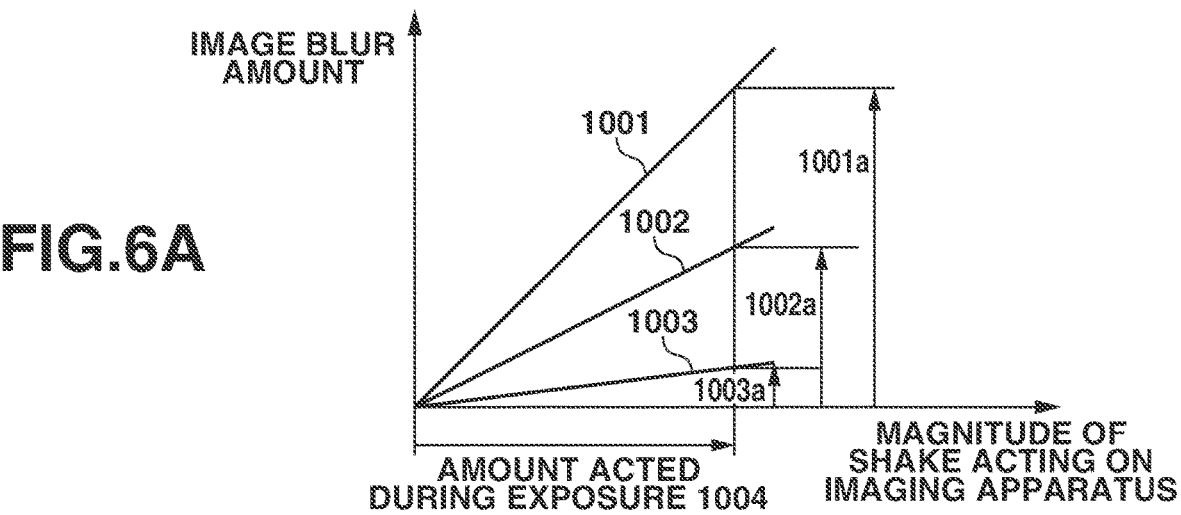
FIG. 6A illustrates a relation between the setting of the division control unit, a shake acting on the imaging apparatus, and an image blur amount.
Figure 6B:
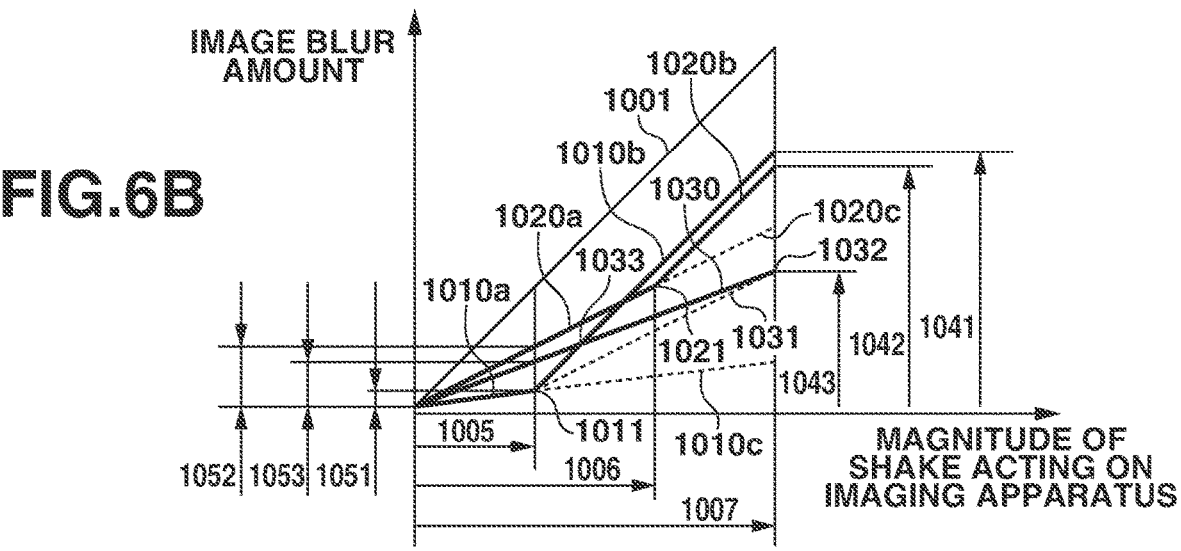
FIG. 6B illustrates a relation between the setting of the division control unit, the shake acting on the imaging apparatus, and the image blur amount.
Figure 6C:
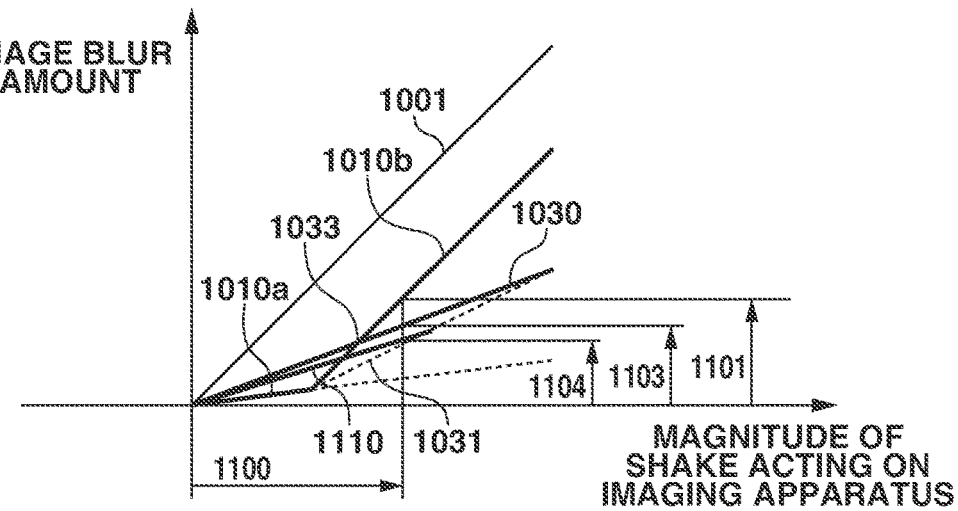
FIG. 6C illustrates a relation between the setting of the division control unit, the shake acting on the imaging apparatus, and the image blur amount.

Effects of using the third division ratio as the final division ratio will be described below with reference to FIGS. 6A, 6B, and 6C. FIGS. 6A, 6B, and 6C are charts illustrating the relation between the amount of shake acting on the imaging apparatus 100 (hereinafter referred to as the shake amount) and the amount of image blur occurring in a captured image. The charts illustrate the image blur amount that has been unable to be corrected (hereinafter referred to as a remaining image blur amount) when the image blur correction is performed. The horizontal axes of the charts in FIGS. 6A, 6B, and 6C indicate the magnitude of a shake acting on the imaging apparatus 100 during exposure. The vertical axes thereof indicate the image blur amount in a captured image caused by a shake.

Differences between the first and second optical image stabilization units, and the relation with the remaining image blur amount will be described below with reference to FIG. 6A. A straight line 1001 indicates a case where the image stabilization is not performed. A straight line 1002 indicates a case where the image stabilization is performed only by the second optical image stabilization unit having a relatively low image stabilization performance A straight line 1003 indicates a case where the image stabilization is performed only by the first optical image stabilization unit having a relatively high image stabilization performance. In FIG. 6A, the gradient of the straight line 1002 is a half of that of the straight line 1001. This means that the image blur amount can be halved in comparison with a case where the image stabilization is not performed (this state is referred to as level one in a camera shake correction effect according to the Camera & Imaging Products Association (CIPA) standards). The gradient of the straight line 1003 is ⅛ that of the straight line 1001. This means that the image blur amount can be reduced to ⅛ in comparison with a case where the image stabilization is not performed (this state is referred to as level three in the image stabilization performance).

In FIG. 6A, when a shake amount 1004 acts on the imaging apparatus 100 during exposure, an image blur amount 1001a occurs if the image stabilization is not performed. Likewise, when the image stabilization is performed by the second optical image stabilization unit, the image blur correction is not completed, resulting in a remaining image blur amount 1002a. When the image stabilization is performed by the first optical image stabilization unit, the image blur correction is not completed, resulting in a remaining image blur amount 1003a. Obviously, the image blur amounts 1002a and 1003a are smaller than the image blur amount 1001a. This means that the image blur amount in a case where the image stabilization is performed is reduced to a further extent than in a case where the image stabilization is not performed.

This is an effect of the image stabilization. Further, the remaining image blur amount 1003a is smaller than the remaining image blur amount 1002a. This means that the image blur amount in a case where the first optical image stabilization unit having a relatively high performance is used is reduced to a further extent than in a case where the second optical image stabilization unit is used. This is a difference in the image stabilization performance.

The influence of the image stabilization range of an image stabilization apparatus and a drive ratio will be described below with reference to FIG. 6B. An image stabilization range 1005 of the first optical image stabilization unit having a relatively high image stabilization performance in FIG. 6B is smaller than an image stabilization range 1006 of the second optical image stabilization unit. A range that is a sum of image stabilization ranges of the first and second optical image stabilization units is represented by an image stabilization range 1007. A polygonal line consisting of straight lines 1010a and 1010b indicate the relation between the shake amount and the image blur amount when only the first optical image stabilization unit is used. A polygonal line consisting of straight lines 1020a and 1020b indicate the relation between the shake amount and the image blur amount when only the second optical image stabilization unit is used. Broken lines 1010c and 1020c indicate the relation between the shake amount and the image blur amount when only the first optical image stabilization unit is used, and the relation between the shake amount and the image blur amount when only the second optical image stabilization unit is used, respectively, when the image stabilization range is not taken into consideration. A broken line 1010c has the same gradient as the straight line 1003 in FIG. 6A, and the broken line 1020c has the same gradient as the straight line 1002 in FIG. 6A. Actually, the states of the broken lines 1010c and 1020c cannot be implemented because of the insufficient image stabilization range.

Points 1011 and 1021 indicate points where the image stabilization ranges of the first and second optical image stabilization units run out, respectively. A straight line 1031 is drawn from the point 1011 with the same gradient as the straight line 1020a. A point 1032 is an intersecting point of the straight line 1031 and an end of the image stabilization range 1007. A straight line 1030 connects the origin and the point 1032. A point 1033 is the intersecting point of the straight line 1030 and the straight line 1010b.

In the descriptions in FIG. 6A, the image stabilization ranges of the optical image stabilization units are ignored. However, actually, the image stabilization ranges are limited as illustrated in FIG. 6B. For example, when a shake larger than the image stabilization range 1005 of the first optical image stabilization unit acts on the imaging apparatus 100, the image stabilization cannot be performed only by the first optical image stabilization unit. Thus, the straight line 1010a is broken at the point 1011, and the gradient of the straight line 1010b for a larger shake is the same as the gradient of the straight line 1001 when the image stabilization is not performed. As a result, the image blur amount when only the first optical image stabilization unit is used is as represented by the straight lines 1010a and 1010b.

Likewise, when only the second optical image stabilization unit is used, the straight line 1020a is broken at the point 1021, and the gradient of the straight line 1020b for a larger shake is the same as the gradient of the straight line 1001. As a result, the image blur amount when only the second optical image stabilization unit is used is as represented by the straight lines 1020*a* and 1020*b*. As described above, the broken lines 1010*c* and 1020*c* cannot be implemented since these are out of the image stabilization range.

In the example in FIG. 6B, the division ratio of the image stabilization range 1005 of the first optical image stabilization unit to the image stabilization range 1006 of the second optical image stabilization unit is 0.33:0.67 (=1:2). This is equivalent to the first division ratio. The straight line 1030 indicates the relation between the shake amount and the image blur amount when the first and second optical image stabilization units are operated based on the division ratio.

The second division ratio that is the ratio that maximizes the image stabilization performance when the image stabilization range is ignored is used in a case where the first optical image stabilization unit is alternatively used. In this case, the second division ratio is 1:0. The relation between the shake amount and the image blur amount in this case is represented by the straight lines 1010*a* and 1010*b*.

In FIG. 6B, a case where the shake amount (image stabilization range) 1005 (=the image stabilization range of the first optical image stabilization unit) acts on the imaging apparatus 100 will be considered below. In this case, an image blur amount 1051 when the first optical image stabilization unit is alternatively used based on the second division ratio is smaller than an image blur amount 1052 when the second optical image stabilization unit is alternatively used. Further, the image blur amount 1051 when the first optical image stabilization unit is alternatively used is smaller than an image blur amount 1053 with the first division ratio that maximizes the image stabilization range. This means that, when the shake amount 1005 acts on the imaging apparatus 100, it is suitable to operate the imaging apparatus 100 based on the second division ratio (to enable maximization of the image stabilization performance).

In FIG. 6B, a case where the shake amount (image stabilization range) 1007 (=the image stabilization range of the first optical image stabilization unit+the image stabilization range of the second optical image stabilization unit) acts on the imaging apparatus 100 will be considered below. In this case, an image blur amount 1042 when the second optical image stabilization unit is alternatively used is smaller than an image blur amount 1041 when the first optical image stabilization unit is alternatively used with the second division ratio. Further, an image blur amount 1043 with the first division ratio that maximizes the image stabilization range is smaller than the image blur amount 1042 when the second optical image stabilization unit is alternatively used. This means that, when the shake amount 1007 acts on the imaging apparatus 100, it is suitable to operate the imaging apparatus 100 based on the first division ratio (to enable maximizing the image stabilization performance).

As described above with reference to FIG. 6B, when the image stabilization range is limited, it is appropriate to provide a suitable division ratio depending on the magnitude of the shake acting on the imaging apparatus 100. The straight lines 1020*a* and 1020*b* that indicate the relation when only the second optical image stabilization unit having a relatively low performance is alternatively used constantly causes a larger image blur amount than the straight line 1030 indicating the first division ratio. Therefore, the straight lines 1020*a* and 1020*b* are not suitable as targets of operation assignment. Thus, to avoid complexity in the drawings, this option is omitted in illustration of FIG. 6C.

The method discussed in Japanese Patent Application Laid-Open No. 2019-129373 will be described below with reference to FIG. 6B. Japanese Patent Application Laid-Open No. 2019-129373 discloses a technique used when a plurality of blur correction units is provided. The technique mainly operates one of the image blur correction units having a higher performance, and operates the other image blur correction unit when the one of the units approaches the stroke end. When this operation is suitably implemented, the relation between the shake amount and the image blur amount traces the following path: origin-point 1011-(straight line 1031)-point 1032. This method enables minimization of the image blur amount. On the other hand, the use of this method requires nonlinear processing in the vicinity of the point 1011. If shakes complicatedly act on the imaging apparatus 100 across a boundary, the imaging apparatus 100 may be unable to suitably operate because of a communication delay, nonlinear processing such as initial movement and quick stop, and responses from the image blur correction units. It is also necessary to constantly monitor the approach to the end of the image stabilization range, and switch processing at a high speed. The processing requires a large amount of resources and thus cannot easily be implemented by general built-in devices. Thus, in the present exemplary embodiment, there is proposed a method for changing the final division ratio depending on the imaging conditions. The method enables reducing the remaining image blur amount in a simpler way than the method discussed in Japanese Patent Application Laid-Open No. 2019-129373 and to a further extent than the configuration using only the first and second division ratios.

FIG. 6C illustrate an example of a case where the third division ratio is suitable. A straight line 1110 indicates a relation between the shake amount and the image blur amount when the first and second optical image stabilization units are operated based on the third division ratio.

In the example in FIG. 6C, the third division ratio of the first and second optical image stabilization units is 1:1. In this case, the gradient of the straight line 1110 is a value between the gradients of the straight lines 1010*a* and 1020*a* illustrated in FIG. 6B. Since the first division ratio is 1:2, the gradient of the straight line 1110 is smaller than that of the straight line 1030. An accurate gradient can be calculated from the image blur amount and the division ratio. For example, when the division ratio is 1:1, the gradient is $\frac{1}{2} \times \frac{1}{2} + \frac{1}{8} \times \frac{1}{2} = \frac{5}{16}$ based on the gradients $\frac{1}{2}$ and $\frac{1}{8}$. When the division ratio is 1:2, the gradient is $\frac{1}{2} \times \frac{2}{3} + \frac{1}{8} \times \frac{1}{3} = \frac{3}{8} = \frac{6}{16}$.

When a shake 1100 acts on the imaging apparatus 100, an image blur amount 1104 when the imaging apparatus 100 is operated based on the third division ratio is smaller than an image blur amount 1101 when the imaging apparatus 100 is operated based on the second division ratio and an image blur amount 1103 when the imaging apparatus 100 is operated based on the first division ratio. More specifically, the image stabilization performance when the imaging apparatus 100 is operated based on the third division ratio is higher than that when the imaging apparatus 100 is operated based on the first or second division ratio. This is an effect of using the third division ratio. When a plurality of image stabilization units is provided, a high performance can be obtained by suitably performing the image blur correction by a simple method.

Referring back to FIG. 2, the drive amount conversion unit 207 converts the correction amount (the correction amount and the correction angle on the imaging plane) output from the first correction amount division unit 921 into a moving amount for suitably performing the image blur correction by the lens-type image blur correction unit 105, and outputs the moving amount as a target drive position. The position sensor 212 detects positional information for the lens-type image blur correction unit 105. The subtracter 208 subtracts the positional information for the lens-type image blur correction unit 105 from the target drive position to obtain deviation data. The deviation data is input to the control filter 209, subjected to various types of signal processing such as gain amplification and phase compensation, and then supplied to the OIS drive unit 210. The OIS drive unit 210 drives the lens-type image blur correction unit 105 based on the output of the control filter 209. Thus, the correction optical system moves in a direction perpendicular to the optical axis. Then, the positional information for the lens-type image blur correction unit 105 that has moved is detected by the position sensor 212 again. Then, the next deviation data is calculated. More specifically, a feedback loop is formed in which the lens-type image blur correction unit 105 is controlled so that a difference between the target drive position and the positional information is minimized. This control enables driving of the correction optical system to follow the target drive position.

The drive amount conversion unit 213 converts the second correction amount output from the second correction amount division unit 922 into a moving amount for suitably performing the image blur correction via the imaging plane image blur correction unit 117, and outputs the moving amount as the target drive position. The position sensor 218 detects the positional information for the imaging plane image blur correction unit 117. The subtracter 214 subtracts the positional information for the imaging plane image blur correction unit 117 from the target drive position to obtain deviation data. The deviation data is input to the control filter 215, subjected to various types of signal processing such as gain amplification and phase compensation, and then supplied to the IBIS drive unit 216. The IBIS drive unit 216 drives the imaging plane image blur correction unit 117 based on the output of the control filter 215. This control moves the imaging plane in a direction perpendicular to the optical axis.

In this way, the lens-type image blur correction unit 105 and the imaging plane image blur correction unit 117 collaboratively operate to share the correction of the image blur corresponding to the shake acting on the entire imaging apparatus 100. Such a collaborative operation enables expanding the image blur correction possible range. When alternatively using only either of the correction units, a division ratio of 1:0 is also referred to as collaboration in a broad sense.

As described above, in the first exemplary embodiment, when the imaging apparatus 100 includes a plurality of image stabilization units, the collaborative image blur correction can be performed at the division ratio determined depending on the imaging conditions.

Accordingly, in the first exemplary embodiment, an image blur control apparatus capable of obtaining a totally high image stabilization performance can be provided.

In addition, the collaborative image blur correction can be performed by using a division ratio (third division ratio) between the division ratio in consideration of the image stabilization range and the division ratio in consideration of the image stabilization performance. Accordingly, an image blur control apparatus capable of obtaining a totally high image stabilization performance can be provided.

While, in the present exemplary embodiment, the correction division setting unit 913 is provided in the camera body 100b, the correction division setting unit 913 may be provided in the interchangeable lens 100a. While, in the present exemplary embodiment, the correction division setting unit 913 that acquires the final division ratio also functions as a unit for acquiring the first division ratio and a unit for acquiring the second division ratio based on the information acquired from the lens storage unit 911 and the camera storage unit 912. However, these units may be configured as separate blocks.

A second exemplary embodiment will be described below. In the present exemplary embodiment, the basic configuration of the imaging apparatus 100 is similar to that according to the first exemplary embodiment (see FIG. 1). Differences from the first exemplary embodiment will be mainly described below.

The first exemplary embodiment has been described above centering on a configuration in which the interchangeable lens 100a acquires the image blur correction amount for the entire imaging apparatus 100 by using the angular velocity sensor 201 in the interchangeable lens 100a, and the camera body 100b acquires the image blur correction amount for the entire imaging apparatus 100 by using the angular velocity sensor 901 in the camera body 100b. The first exemplary embodiment has been further described above centering on a configuration in which the acquired image blur correction amount for the entire imaging apparatus 100 is divided by the first correction amount division unit 921 and the second correction amount division unit 922, and the lens-type image blur correction unit 105 and the imaging plane image blur correction unit 117 perform the image blur correction in a collaborative way.

On the other hand, the second exemplary embodiment will be described below centering on a configuration in which the correction amount for driving each image blur correction unit is acquired by using the angular velocity sensor 901 included in the camera body 100b. The camera body 100b controls the image blur correction by the lens-type image blur correction unit 105 by transmitting the first correction amount to the interchangeable lens 100a. The camera body 100b also controls the imaging plane image blur correction unit 117 by using a second image blur correction amount calculated by the camera body 100b. In this case, the total of the first and second blur correction amounts is 1 (that is equal to the output of the image blur correction amount calculation unit 903).

Figure 7:
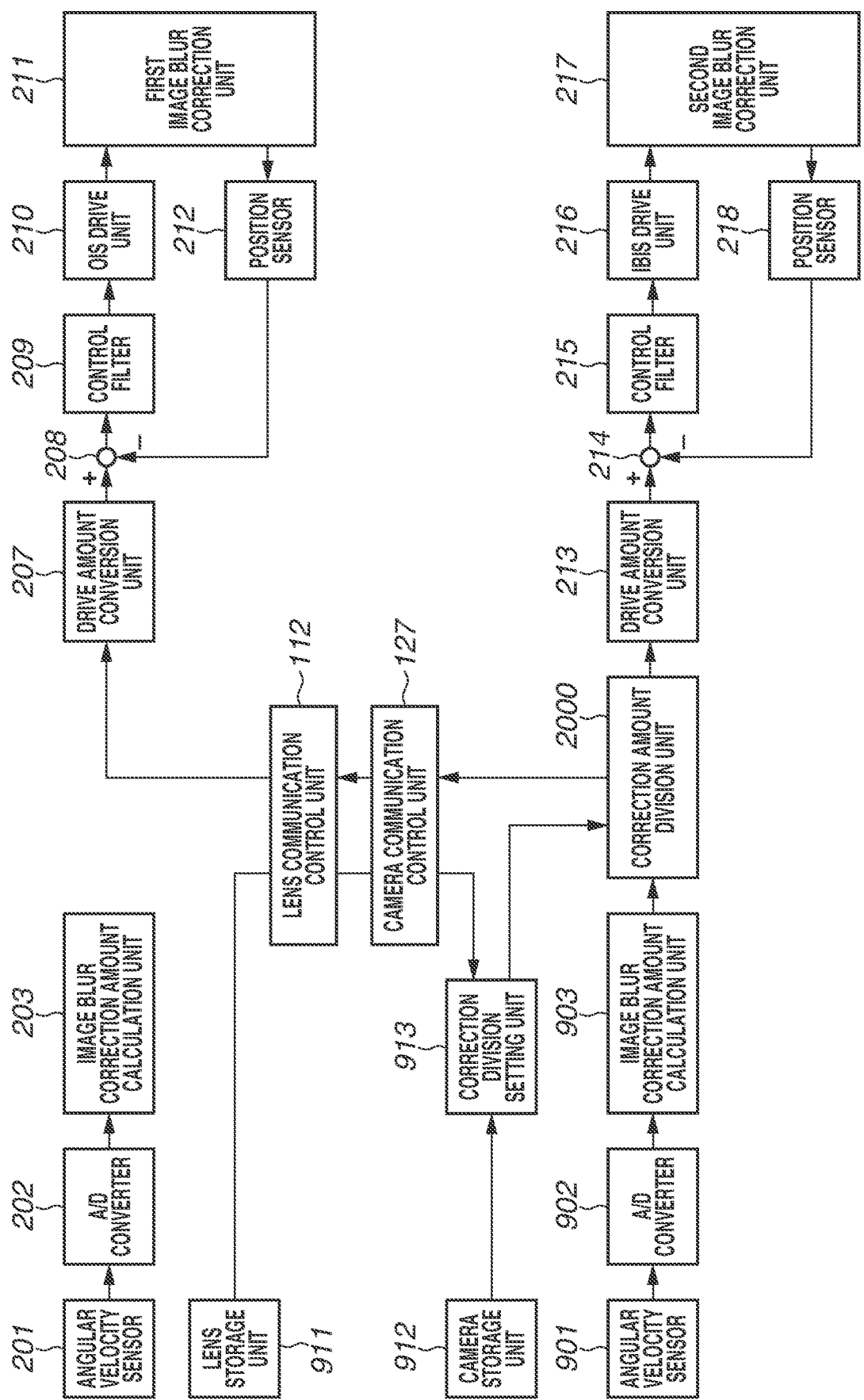
FIG. 7 is a block diagram illustrating image blur correction control according to a second exemplary embodiment.

FIG. 7 is a block diagram illustrating the image blur correction control according to the second exemplary embodiment. The configuration in FIG. 7 differs from the configuration in FIG. 2 in that the first correction amount division unit 921 is not provided but a correction amount division unit 2000 is provided. The configuration in FIG. 7 also differs from the configuration in FIG. 2 in that the angular velocity sensor 201, the A/D converter 202, and the image blur correction amount calculation unit 203 included in the interchangeable lens 100a are not connected to other blocks because these units are not used to control the image blur correction operation.

In FIG. 7, the correction amount division unit 2000 is implemented by the camera system control unit 126. The correction division setting unit 913 and the correction amount division unit 2000 serve as division control units according to the present exemplary embodiment. In FIG. 7, the drive amount conversion unit 207 receives a drive amount (first correction amount) from the correction amount division unit 2000 via the camera communication control unit 127 and the lens communication control unit 112, and operates the lens-type image blur correction unit 105.

Figure 8A:
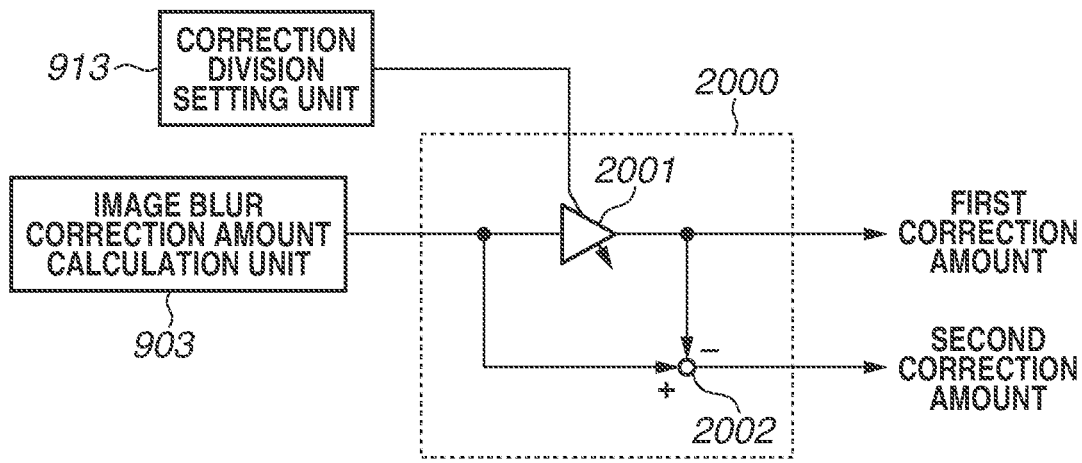
FIG. 8A is a block diagram illustrating an example of a configuration of a division control unit according to the second exemplary embodiment.
Figure 8B:
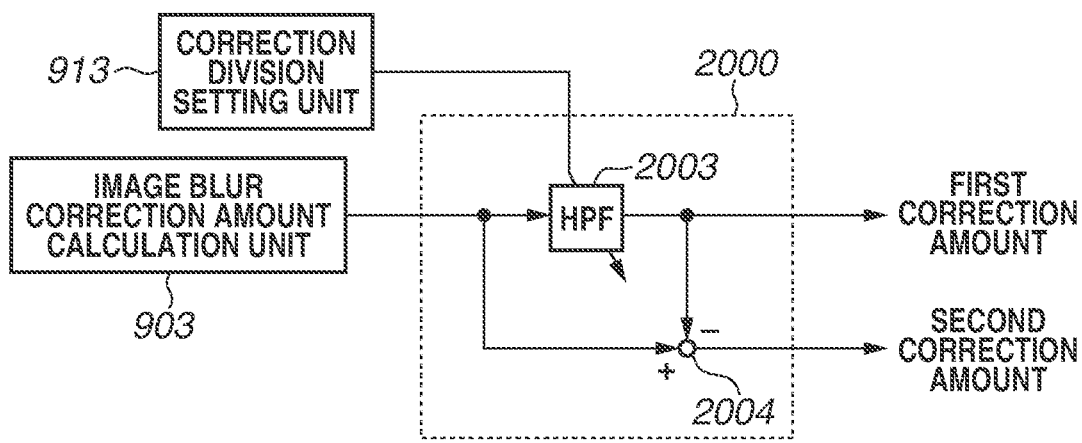
FIG. 8B is a block diagram illustrating an example of the configuration of the division control unit according to the second exemplary embodiment.
Figure 8C:
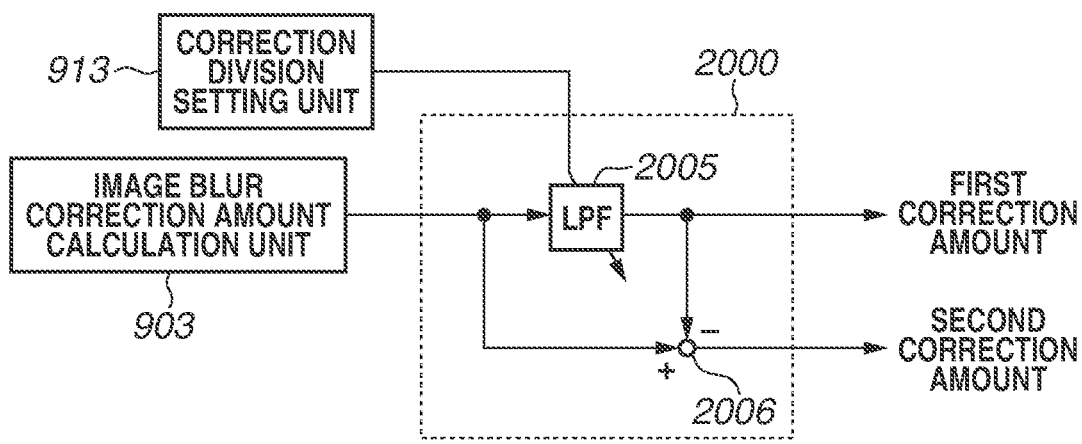
FIG. 8C is a block diagram illustrating an example of the configuration of the division control unit according to the second exemplary embodiment.

FIGS. 8A, 8B, and 8C are block diagrams illustrating examples of configurations of the correction division setting unit 913 and the correction amount division unit 2000 serving as the division control units. The correction amount division unit 2000 has functions of the first correction amount division unit 921 and the second correction amount division unit 922 according to the first exemplary embodiment, and divides the image blur correction amount for the entire imaging apparatus 100 into the first and second correction amounts. FIG. 8A illustrates an example of dividing the image blur correction amount by using the gain, and FIGS. 8B and 8C illustrate examples of dividing the image blur correction amount by using filters.

In FIG. 8A, a multiplier 2001 multiplies the image blur correction amount calculated by the image blur correction amount calculation unit 903 by the first magnification K1 determined by the correction division setting unit 913, and outputs the first correction amount. In this case, the first magnification K1 satisfies Formula 1 as in the first exemplary embodiment. The image blur correction amount multiplied by the first magnification K1 by the multiplier 2001 serves as the first correction amount used by the lens-type image blur correction unit 105 to perform the image blur correction. A subtracter 2002 subtracts the amount calculated by the multiplier 2001 (first correction amount) from the correction amount for the entire imaging apparatus 100 calculated by the image blur correction amount calculation unit 903 to calculate the second correction amount. The image blur correction amount is divided in such a way that the first and second correction amounts added together gives the image blur correction amount for the entire imaging apparatus 100. As in the first exemplary embodiment, the first and second correction amounts may be acquired by using the first magnification K1 and the second magnification K2 (K2=1−K1).

While, in the example illustrated in FIG. 8A, the image blur correction amount is divided based on a predetermined ratio, the image blur correction amount may be divided based on a frequency band. FIGS. 8B and 8C illustrate examples of configurations of the correction amount division unit 2000 when the image blur correction amount is divided based on a frequency band.

In FIG. 8B, an HPF 2003 passes only the high-frequency band. The HPF 2003 passes only the high-frequency band of the image blur correction amount calculated by the image blur correction amount calculation unit 903, and acquires the band as the first correction amount. A subtracter 2004 subtracts the first correction amount (high-frequency components) acquired by the HPF 2003 from the correction amount for the entire imaging apparatus 100 to extract the second correction amount (low-frequency components). As in the first exemplary embodiment, either the lens-type image blur correction unit 105 or the imaging plane image blur correction unit 117 having a higher image blur correction performance is to be assigned to the low-frequency components. The configuration in FIG. 8C is similar to FIG. 8B except that an LPF 2005 is used as the filter. The second correction amount (high-frequency components) is extracted by subtracting the first correction amount (low-frequency components) acquired by the LPF 2005 from the correction amount for the entire imaging apparatus 100.

This configuration enables division of the correction amount for the entire imaging apparatus 100 into the first and second correction amounts based on the final division ratio, as in the first exemplary embodiment. This enables control of the image blur correction by the lens-type image blur correction unit 105 and the imaging plane image blur correction unit 117 based on the final division ratio.

The method for acquiring the final division ratio is similar to that according to the first exemplary embodiment. More specifically, the first division ratio that maximizes the image stabilization range, the second division ratio that maximizes the image stabilization performance, or the third division ratio between the first and second division ratios is selected depending on the imaging conditions of the camera. As in the first exemplary embodiment, when a small image blur amount is predicted and the image stabilization performance is to be maximized, it is desirable to alternatively operate one of the units having a higher image stabilization performance by setting the second division ratio as the final division ratio. If the image stabilization performance is assumed to be identical, the units may be operated at 1:1. When a large image blur amount is predicted and the image stabilization range is to be maximized, the first division ratio is set as the final division ratio. The third division ratio between the first and second division ratios may be set as the final division ratio depending on the magnitude of the shake expected to act on the imaging apparatus 100. As a result, when the imaging apparatus 100 includes a plurality of image stabilization units, the imaging apparatus 100 suitably performs the image blur correction by a simple method, making it possible to obtain a totally high image stabilization performance.

While, in the present exemplary embodiment, the correction division setting unit 913 and the correction amount division unit 2000 are included in the camera body 100*b*, these units may be included in the interchangeable lens 100*a*.

While, in the configuration according to the present exemplary embodiment (FIG. 7), the angular velocity sensors 201 and 901 are included in the interchangeable lens 100*a* and the camera body 100*b*, respectively, a control system is configured by using only the angular velocity sensor 901. The other angular velocity sensor 201 may also be used.

More desirably, which of the angular velocity sensors 201 and 901 is to be used may be selected based on information stored in the lens storage unit 911 and the camera storage unit 912. More specifically, as described above in the first exemplary embodiment, an HPF 701 is included in each of the image blur correction amount calculation units 203 and 903 (see FIG. 3). The characteristics of the filter are determined by the performances of the angular velocity sensors 201 and 901. Thus, information about the performances of the angular velocity sensors 201 and 901, such as the cutoff frequency of the HPF 701, is stored in the lens storage unit 911 and the camera storage unit 912, respectively. With this configuration, either of the angular velocity sensors having a lower cutoff frequency of the HPF 701 is assumed to have a higher performance. Thus, information about the angular velocity sensor having a higher performance is to be input to the correction amount division unit 2000.

A third exemplary embodiment will be described below. In the third exemplary embodiment, the basic configuration of the imaging apparatus 100 is similar to that according to the first exemplary embodiment (see FIGS. 1 and 2). Differences from the first exemplary embodiment will be mainly described below.

In the first exemplary embodiment, the image stabilization ranges of the image blur correction units are respectively acquired from the lens storage unit 911 and the camera storage unit 912, and the first division ratio that maximizes the image stabilization range is acquired. The present exemplary embodiment differs from the first exemplary embodiment in that the first division ratio is predetermined and stored in the storage unit of either the interchangeable lens 100*a* or the camera body 100*b* that includes the correction division setting unit 913. The imaging apparatus 100 is an imaging system that uses the interchangeable lens 100*a* and the camera body 100b in combination. In such an imaging system, a combination of various types of lenses and cameras is considered. However, in a certain imaging system, the difference in the image stabilization range is assumed to be small depending on the interchangeable lens 100a or the camera body 100b. In this case, the imaging system can determine the first division ratio based on an assumed approximate image stabilization range instead of acquiring the image stabilization range from respective storage units and then strictly acquiring the first division ratio, to determine the final division ratio in an easier way than in the first exemplary embodiment. For example, in an imaging system where the operation ranges of the interchangeable lens 100a and the camera body 100b are considered to be approximately equal, the first division ratio can be predetermined as 1:1.

In the present exemplary embodiment, information about the image stabilization performance is acquired from the first and second storage units, but information about the image stabilization range is not acquired since the first division ratio has already been determined. The correction division setting unit 913 sets a fourth division ratio as the final division ratio. In the fourth division ratio, the ratio of the first optical image stabilization unit having a relatively high image stabilization performance is made larger than that in the first division ratio. This setting enables obtaining a similar effect to the effect obtained in a case where the imaging apparatus 100 is operated based on the third division ratio according to the first exemplary embodiment. More specifically, it becomes possible to ensure the image stabilization range corresponding to the image blur amount which may occur during exposure and, at the same time, implement control that utilizes the image stabilization performance.

It is often the case that an image blur that can be dealt with by the interchangeable lens 100a is similarly ensured regardless of the focal length. On the other hand, generally, an image blur that can be dealt with by the camera body 100b relatively decreases with an increase in focal length. An image blur amount Δx is represented by Formula 3, where f denotes the focal length and Δθ denotes the shake amount.

$$\Delta x = f \tan \Delta \theta \quad \text{(Formula 3)}$$

As understood from Formula 3, the image blur occurring on the imaging plane increases with an increase in focal length. On the other hand, the operation range of the imaging plane image blur correction unit 117 included in the camera body 100b is invariable, and hence a small range (Δθ) of shakes can be dealt with.

Accordingly, the relations may be stored in a table for reference and use. For example, for a focal length of 50 mm, the first division ratio of the interchangeable lens 100a and the camera body 100b is set to 1:2 (the ratio of the camera body 100b is larger). For a focal length of 100 mm, the first division ratio of the interchangeable lens 100a and the camera body 100b is set to 1:1 (the ratios of the camera body 100b and the interchangeable lens 100a are equal).

For a focal length of 200 mm, the first division ratio of the interchangeable lens 100a and the camera body 100b is set to 2:1 (the ratio of the interchangeable lens 100a is larger). The first division ratio may be determined based on the focal length in this way, and the correction division setting unit 913 may acquire the first division ratio predetermined based on the focal length of the imaging optical system from the storage unit.

In the present exemplary embodiment, the fourth division ratio is acquired and set as the final division ratio. In the fourth division ratio, the ratio of the image stabilization unit having a higher performance is increased with reference to the first division ratio. In the above-described example, when the camera body 100b has a higher performance and the focal length is 100 mm, the ratio of the camera body 100b may be increased (for example, the division ratio may be changed from 1:1 to 1:2). As in the first exemplary embodiment, how much the division ratio is to be changed may be determined taking the imaging conditions into consideration.

As described above, in the third exemplary embodiment, an imaging apparatus is provided which is capable of suitably performing the collaborative image blur correction with a simple configuration and obtaining a totally high image stabilization performance when the imaging apparatus includes a plurality of image stabilization units.

While, in the above-described exemplary embodiments, the shake detection is performed by using angular velocity sensors, the shake detection may be performed by using another configuration. In an applicable configuration, for example, the shake amount is calculated from the acceleration by using an acceleration sensor, or motion information is detected from image data to calculate the shake amount of the imaging apparatus 100.

While, in the above-described exemplary embodiments, the image blur correction unit included in the interchangeable lens 100a is the lens-type image blur correction unit, an optical image blur correction unit using a non-lens optical element such as a prism is also applicable.

In the above-described first and second exemplary embodiments, there are provided imaging conditions for setting each of the first and second division ratios as the final division ratio. However, the third division ratio may be constantly set depending on the settable focal length and the size of the image stabilization range.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-108059, filed Jun. 29, 2021, which is hereby incorporated by reference herein in its entirety.

What is claimed is:

1. An apparatus that controls image blur correction by using a first correction unit and a second correction unit having a lower image blur correction performance than that of the first correction unit, the apparatus comprising:
   a first acquisition unit configured to acquire a first division ratio;
   a determination unit configured to determine a final division ratio based on the first division ratio; and
   a control unit configured to control the first and second correction units based on the determined final division ratio,
   wherein the determination unit can determine a division ratio where a ratio of the first correction unit is larger than that in the first division ratio, as the final division ratio.

2. The apparatus according to claim 1, wherein the first division ratio varies depending on a focal length of an optical system.

3. The apparatus according to claim 1, wherein the control unit controls the first and second correction units so that a ratio between image blur correction amounts of the first and second correction units on an imaging plane becomes the final division ratio.

4. The apparatus according to claim 1, wherein the first acquisition unit is configured to:
   acquire information about a movable range of the first correction unit and information about a movable range of the second correction unit; and
   determine the first division ratio based on the information about the movable range of the first correction unit and the information about the movable range of the second correction unit.

5. The apparatus according to claim 1,
   wherein the first division ratio is predetermined and stored in a storage unit, and
   wherein the first acquisition unit acquires the first division ratio by reading the first division ratio from the storage unit.

6. The apparatus according to claim 1, further comprising a second acquisition unit configured to determine and acquire a second division ratio based on the image blur correction performances of the first and second correction units,
   wherein the determination unit determines the final division ratio based on the first and second division ratios.

7. The apparatus according to claim 6,
   wherein the first division ratio is a division ratio that maximizes an image blur correction possible range by using the first and second correction units,
   wherein the second division ratio is a division ratio that maximizes the image blur correction performance, and
   wherein the final division ratio is a ratio between the first and second division ratios.

8. The apparatus according to claim 1, further comprising an acquisition unit configured to acquire at least one of an imaging condition set in an imaging apparatus including one of the first and second correction units and an imaging condition set in an interchangeable lens including the other of the first and second correction units,
   wherein the determination unit determines the final division ratio based on the acquired imaging condition.

9. The apparatus according to claim 8, wherein the imaging condition includes at least an exposure time, a focal length of an optical system, an image forming magnification of the optical system, or a camera shake which acted on a camera during a time period before image capturing.

10. The apparatus according to claim 8, wherein the determination unit may set the first division ratio as the final division ratio depending on the imaging condition.

11. The apparatus according to claim 1, wherein the final division ratio indicates a gain.

12. The apparatus according to claim 1, wherein the final division ratio indicates a cutoff frequency.

13. An interchangeable lens attachable to an imaging apparatus, the interchangeable lens comprising:
   the apparatus according to claim 1; and
   an optical system,
   wherein the optical system comprises a correction unit configured to function as either the first or second correction unit.

14. An imaging apparatus to which an interchangeable lens is attachable, the imaging apparatus comprising:
   the apparatus according to claim 1;
   a sensor configured to capture light from the interchangeable lens; and
   an actuator configured to move the sensor,
   wherein an imaging plane correction unit including the sensor and the actuator functions as either the first or second correction unit.

15. An apparatus that controls image blur correction by using a first correction unit and a second correction unit having a lower image blur correction performance than that of the first correction unit, the apparatus comprising:
   an acquisition unit configured to acquire at least one of an imaging condition set in an imaging apparatus including one of the first and second correction units and an imaging condition set in an interchangeable lens including the other of the first and second correction units; and
   a control unit configured to control the first and second correction units based on a division ratio corresponding to the acquired imaging condition,
   wherein, when the imaging condition satisfies a predetermined condition, the control unit controls the first and second correction units by using a division ratio where the ratio of the first correction unit is larger than that in a ratio between an image blur correction possible amount of the first correction unit on the imaging plane and an image blur correction possible amount of the second correction unit on the imaging plane.

16. The apparatus according to claim 15,
   wherein the acquisition unit acquires information indicating an exposure time of the imaging apparatus, and
   wherein the control unit determines that the imaging condition satisfies the predetermined condition when the exposure time is shorter than a predetermined value.

17. The apparatus according to claim 15,
   wherein the acquisition unit acquires information indicating a focal length of an optical system, and
   wherein the control unit determines that the imaging condition satisfies the predetermined condition when the focal length is shorter than a predetermined value.

18. A method for controlling image blur correction by using a first correction unit and a second correction unit having a lower image blur correction performance than the first correction unit, the method comprising:
- acquiring a first division ratio;
- determining a final division ratio based on the first division ratio; and
- controlling the first and second correction units based on the final division ratio,
- wherein, in determining the final division ratio, a division ratio where a ratio of the first correction unit is larger than that in the first division ratio can be determined as the final division ratio.

19. A method for controlling image blur correction by using a first correction unit and a second correction unit having a lower image blur correction performance than that of the first correction unit, the method comprising:
- acquiring at least one of an imaging condition set in an imaging apparatus including one of the first and second correction units and an imaging condition set in an interchangeable lens including the other of the first and second correction units; and
- controlling the first and second correction units based on a division ratio corresponding to the acquired imaging condition,
- wherein, when the imaging condition satisfies a predetermined condition, the first and second correction units are controlled by using a division ratio where the ratio of the first correction unit is larger than that in a ratio between an image blur correction possible amount of the first correction unit on the imaging plane corresponding to a movable range and an image blur correction possible amount of the second correction unit on the imaging plane corresponding to a movable range.

* * * * *